United States Patent
Herberg et al.

(10) Patent No.: US 11,283,903 B2
(45) Date of Patent: *Mar. 22, 2022

(54) DEMAND RESPONSE EVENT DISSEMINATION SYSTEM AND METHOD

(71) Applicant: FUJITSU LIMITED, Kawasaki (JP)

(72) Inventors: Ulrich Herberg, Sunnyvale, CA (US); Jorjeta G. Jetcheva, San Jose, CA (US); Daisuke Mashima, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 173 days.

This patent is subject to a terminal disclaimer.

(21) Appl. No.: 16/565,345

(22) Filed: Sep. 9, 2019

(65) Prior Publication Data
US 2020/0007660 A1    Jan. 2, 2020

Related U.S. Application Data

(62) Division of application No. 13/968,525, filed on Aug. 16, 2013, now Pat. No. 10,432,753.

(51) Int. Cl.
*H04L 29/06* (2006.01)
*H04L 29/08* (2006.01)
(Continued)

(52) U.S. Cl.
CPC .......... *H04L 67/42* (2013.01); *H04L 63/0428* (2013.01); *H04L 63/0823* (2013.01);
(Continued)

(58) Field of Classification Search
CPC . H04L 67/42; H04L 63/0428; H04L 63/0823; H04L 67/104; H04L 29/08;
(Continued)

(56) References Cited

U.S. PATENT DOCUMENTS

| | | | |
|---|---|---|---|
| 8,359,470 B1 * | 1/2013 | Choi | H04W 12/122 713/170 |
| 2003/0078062 A1 | 4/2003 | Burr | |

(Continued)

FOREIGN PATENT DOCUMENTS

| | | |
|---|---|---|
| CN | 2012-54989 Y | 6/2009 |
| JP | H09-219721 A | 8/1997 |

(Continued)

OTHER PUBLICATIONS

Japanese Office Action dated Oct. 17, 2017 in application No. 2014-048812.

(Continued)

*Primary Examiner* — Hitesh Patel
*Assistant Examiner* — Clifton Houston
(74) *Attorney, Agent, or Firm* — Maschoff Brennan

(57) ABSTRACT

A method may include receiving peer data describing a set of peer clients associated with a demand response application server and describing how the peer clients communicate with one another. The peer data may be configured so that a subset of the peer clients directly communicate with the demand response application server and the demand response application server does not directly communicate with each of the peer clients. The method may also include receiving announcement data describing an event specified by the demand response application server and determining event response data responsive to the announcement data. The method may also include identifying, from the set of peer clients specified by the demand response application server, a set of recipient peer clients to receive the event response data.

15 Claims, 13 Drawing Sheets

(51) Int. Cl.
  *G06Q 50/06* (2012.01)
  *G06F 15/16* (2006.01)
  *H04L 67/01* (2022.01)
  *H04L 67/104* (2022.01)
  *G06Q 10/06* (2012.01)

(52) U.S. Cl.
  CPC ........... *H04L 67/104* (2013.01); *G06Q 10/06* (2013.01); *G06Q 50/06* (2013.01)

(58) Field of Classification Search
  CPC ........ H04L 67/10; G06Q 10/06; G06Q 50/06; G06Q 30/02
  See application file for complete search history.

(56) References Cited

U.S. PATENT DOCUMENTS

| | | | |
|---|---|---|---|
| 2004/0030744 A1 | 2/2004 | Rubin | |
| 2005/0130647 A1 | 6/2005 | Matsuda | |
| 2006/0075506 A1 | 4/2006 | Sanda | |
| 2006/0190724 A1 | 8/2006 | Adams | |
| 2006/0285693 A1 | 12/2006 | Raikar | |
| 2007/0192584 A1 | 8/2007 | Bajar | |
| 2008/0144548 A1* | 6/2008 | Shuey | G01D 4/004 370/310 |
| 2008/0256172 A1* | 10/2008 | Hebert | G06Q 10/10 709/202 |
| 2009/0132308 A1 | 5/2009 | Randolph | |
| 2009/0210484 A1 | 8/2009 | Schneider | |
| 2010/0076835 A1 | 3/2010 | Silverman | |
| 2010/0272266 A1* | 10/2010 | Nadooshan | H04L 9/085 380/278 |
| 2011/0060798 A1* | 3/2011 | Cho | H04L 67/1031 709/206 |
| 2011/0138028 A1* | 6/2011 | Katz | G06Q 10/10 709/223 |
| 2011/0141911 A1 | 6/2011 | Washam | |
| 2011/0258018 A1 | 10/2011 | Tyagi | |
| 2012/0065805 A1* | 3/2012 | Montalvo | H02J 3/144 700/297 |
| 2012/0197457 A1* | 8/2012 | Walter | G06Q 50/06 700/297 |
| 2012/0245749 A1* | 9/2012 | Littrell | H02J 3/14 700/291 |
| 2012/0254286 A1 | 10/2012 | Harlow | |
| 2012/0310428 A1 | 12/2012 | Katagi | |
| 2012/0323393 A1* | 12/2012 | Imhof | H02J 3/00 700/297 |
| 2013/0101117 A1 | 4/2013 | Wicker | |
| 2013/0110970 A1 | 5/2013 | Meyerhofer | |
| 2013/0279410 A1* | 10/2013 | Dublin, III | H04L 45/122 370/328 |
| 2014/0067150 A1 | 3/2014 | Songkakul | |
| 2014/0089619 A1* | 3/2014 | Khanna | G06F 16/273 711/166 |
| 2014/0115336 A1 | 4/2014 | Hwang | |
| 2014/0181933 A1 | 6/2014 | Sanjeev | |
| 2014/0277795 A1 | 9/2014 | Matsuoka | |
| 2014/0344411 A1* | 11/2014 | Gailis | H04L 67/02 709/219 |
| 2015/0026796 A1 | 1/2015 | Alan | |
| 2015/0088315 A1 | 3/2015 | Behrangrad | |
| 2015/0134280 A1 | 5/2015 | Narayan | |

FOREIGN PATENT DOCUMENTS

| | | |
|---|---|---|
| JP | 2011-229374 A | 11/2011 |
| JP | 2012-252580 A | 12/2012 |

OTHER PUBLICATIONS

Kitagawa, Technology Behind Smart Meter Network, Fujitsu Limited, Nov. 9, 2012, the 63rd volume, No. 6, and p. 662 to 667.

Takafumi Okuyama et al., Two or More Course Setting Technique Aiming at Inhibition of Delay Jitter; Proceedings of Workshop of the Institute of Electronics, Information and Communication Engineers, Japan, Feb. 24, 2005, 104th volume, No. 689, p. 119 to 124.

OpenADR Alliance 2.0a Specification, Released in Aug. 14, 2012.

B. Cohen, "The BitTorrent Protocol Specification," Standard, Jan. 10, 2008.

L. Xiao, Yunhao Liu, L.M. Ni, "Improving unstructred peer-to-peer systems by adaptive connection establishment", IEEE Transactions on Computers, Sep. 2005, vol. 54, pp. 1091-1103.

Liu, Yunhao, et al. "Location awareness in unstructured peer-to-peer systems." Parallel and Distributed Systems, IEEE Transactions on 16.2 (2005): 163-174.

* cited by examiner

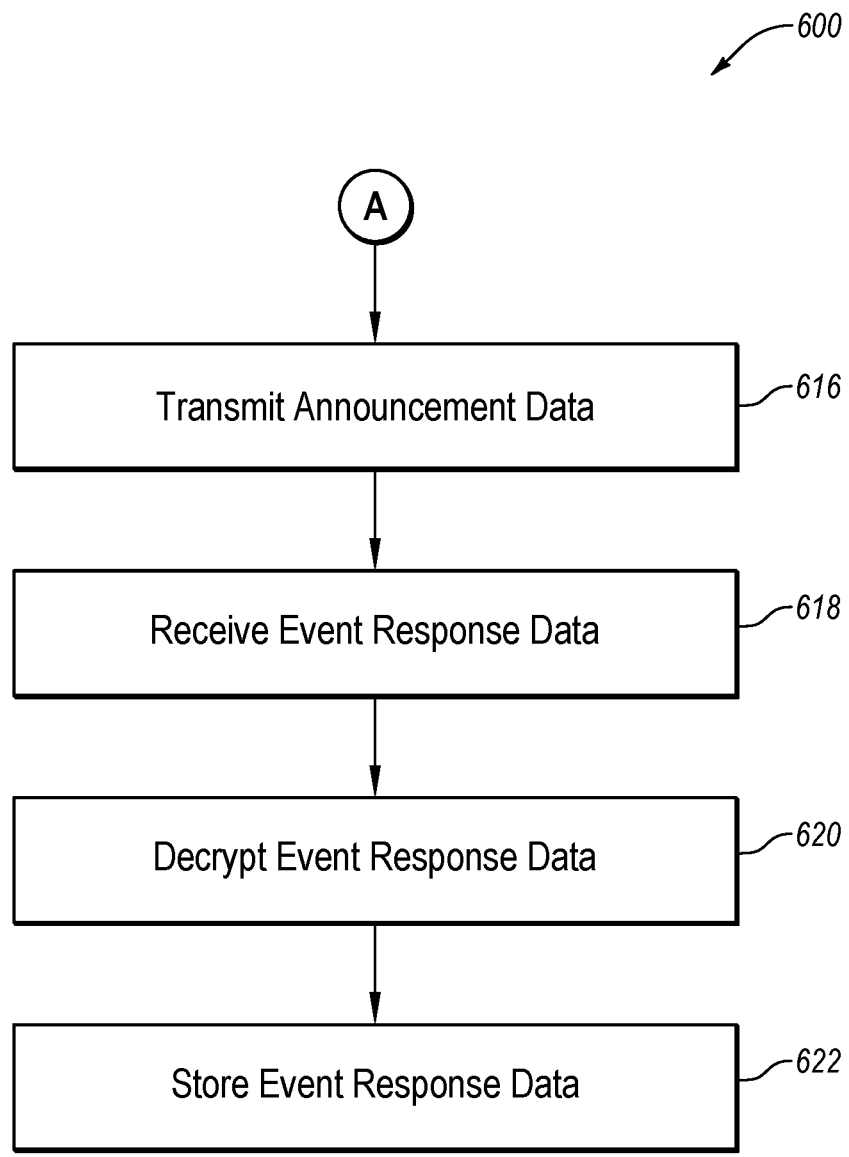

DEMAND RESPONSE EVENT DISSEMINATION SYSTEM AND METHOD

FIELD

The embodiments discussed herein are related to a demand response application server. More particularly, the embodiments discussed herein relate to reducing the bandwidth requirements for a demand response application server.

BACKGROUND

Demand response ("DR") may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR includes all intentional modifications to consumption patterns of electricity of end-use customers that are intended to alter the timing, level of instantaneous demand or the total electricity consumption.

DR policies are rules that describe how end-use customers may modify their consumption patterns of electricity. A DR event is an action taken by an end-use consumer to modify their electricity consumption pattern. Demand response application servers ("DR servers") are hardware servers that work with client devices associated with end-use consumers ("DR clients") to implement DR policies. These DR policies may be defined by a DR application that is implemented by the DR server.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include receiving peer data describing a set of peer clients associated with a demand response application server and describing how the peer clients communicate with one another. The peer data may be configured so that a subset of the peer clients directly communicate with the demand response application server and the demand response application server does not directly communicate with each of the peer clients. The method may also include receiving announcement data describing an event specified by the demand response application server and determining event response data responsive to the announcement data. The method may also include identifying, from the set of peer clients specified by the demand response application server, a set of recipient peer clients to receive the event response data.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 6A and 6B illustrate an example method for determining peer data and announcement data;

DESCRIPTION OF EMBODIMENTS

A typical demand response application server ("DR") server must communicate with numerous demand response ("DR") clients. For example, each DR server may communicate with thousands or millions of DR clients. Communication patterns defined by DR applications require substantial processing and bandwidth capabilities by the DR servers. Presently, each DR server is required to directly communicate with each DR client and maintain persistent connections with each DR client. These communications between the DR server and the DR clients include the DR server distributing DR events and pricing information to each of the DR clients. Accordingly, the DR server experiences high processing and bandwidth loads. The present disclosure relates to reducing the processing and bandwidth loads for DR servers.

Embodiments of the present invention will be explained with reference to the accompanying drawings.

Figure 1:
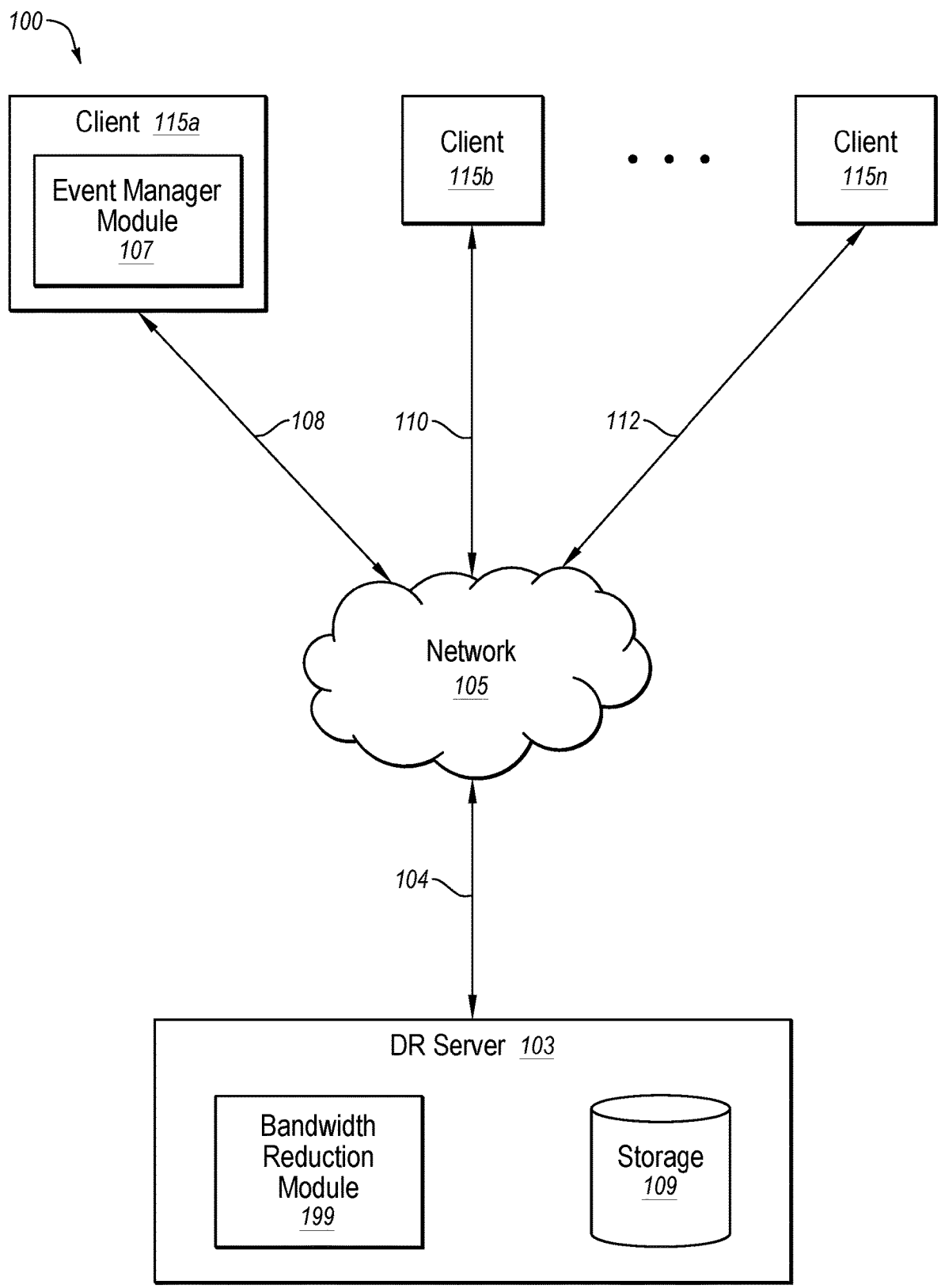
FIG. 1 illustrates a block diagram of some implementations of an example system for data dissemination configured to reduce the processing and bandwidth load for a DR server.

FIG. 1 illustrates a block diagram of some implementations of a system 100 for DR event dissemination configured to reduce the processing and bandwidth load for a DR server, arranged in accordance with at least one embodiment described herein. The illustrated system 100 includes client devices 115a . . . 115n (also referred to herein individually and collectively as 115) and a DR server 103. In the illustrated implementation, these entities of the system 100 are communicatively coupled via a network 105.

The client devices 115 in FIG. 1 may be used by way of example. While FIG. 1 illustrates three client devices 115a, 115b and 115n, the present disclosure applies to a system architecture having one or more client devices 115. Furthermore, although FIG. 1 illustrates one network 105 coupled to the client devices 115 and the DR server 103, in practice, one or more networks 105 may be connected to these entities. Furthermore, while FIG. 1 includes one DR server 103, the architecture 100 could include one or more DR servers 103.

The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols.

In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

The DR server 103 may be a hardware server that includes a processor, a memory and network communication capabilities. In the illustrated implementation, the DR server 103 is coupled to the network 105 via signal line 104. The DR server 103 sends and receives data to and from one or more of the client devices 115 via the network 105. For example, the DR server 103 sends events to the client devices 115 and receives responses from the client devices 115 via the network 105.

The DR server 103 includes a bandwidth reduction module 199 and a storage device 109. The bandwidth reduction module 199 may be code and routines for reducing the bandwidth required for the DR server 103 to provide the functionality described herein. In some implementations, the bandwidth reduction module 199 may be implemented using hardware including a field-programmable gate array ("FPGA") or an application-specific integrated circuit ("ASIC"). In some other instances, the bandwidth reduction module 199 may be implemented using a combination of hardware and software. In some implementations, the bandwidth reduction module 199 may be stored in a combination of the devices and servers, or in one of the devices or servers. In some implementations, the bandwidth reduction module 199 acts in part as a thin-client application that may be stored on the DR server 103 and in part as components that may be stored on the client device 115. The bandwidth reduction module 199 is described in more detail with reference to FIGS. 5, 6A and 6B.

The storage device 109 is a non-transitory memory that stores data for providing the functionality described herein. The storage device 109 may be a dynamic random access memory (DRAM) device, a static random access memory (SRAM) device, flash memory or some other memory devices. In some implementations, the storage device 109 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 109 is described in more detail with reference to FIGS. 5, 6A and 6B.

The client device 115 may be a computing device that includes a memory and a processor. For example, the client device 115 may be a processor-based demand response switch, a server, a laptop computer, a desktop computer, a tablet computer, a mobile telephone, a personal digital assistant ("PDA"), a mobile email device, a portable game player, a portable music player, a television with one or more processors embedded therein or coupled thereto or other electronic device capable of accessing the network 105.

In the illustrated implementation, the client device 115a is communicatively coupled to the network 105 via signal line 108, the client device 115b is communicatively coupled to the network 105 via signal line 110 and the client device 115n is communicatively coupled to the network 105 via signal line 112.

The client device 115 includes an event manager module 107. The event manager module 107 may be code and routines for communicating with the bandwidth reduction module 199 (and, optionally, other event manager modules 107 operable on other client devices 115) to reduce the bandwidth required for the DR server 103 to provide the functionality described herein. In some implementations, the event manager module 107 may be implemented using hardware including a FPGA or ASIC. In some other instances, the event manager module 107 may be implemented using a combination of hardware and software. In some implementations, the event manager module 107 may be stored in a combination of the devices and servers, or in one of the devices or servers. In some implementations, the event manager module 107 acts in part as a thin-client application that may be stored on the client device 115 and in part as components that may be stored on the DR server 103. The event manager module 107 is described in more detail with reference to FIGS. 2-4, 7, 8, 9A, 9B, 10A and 10B.

Figure 2:
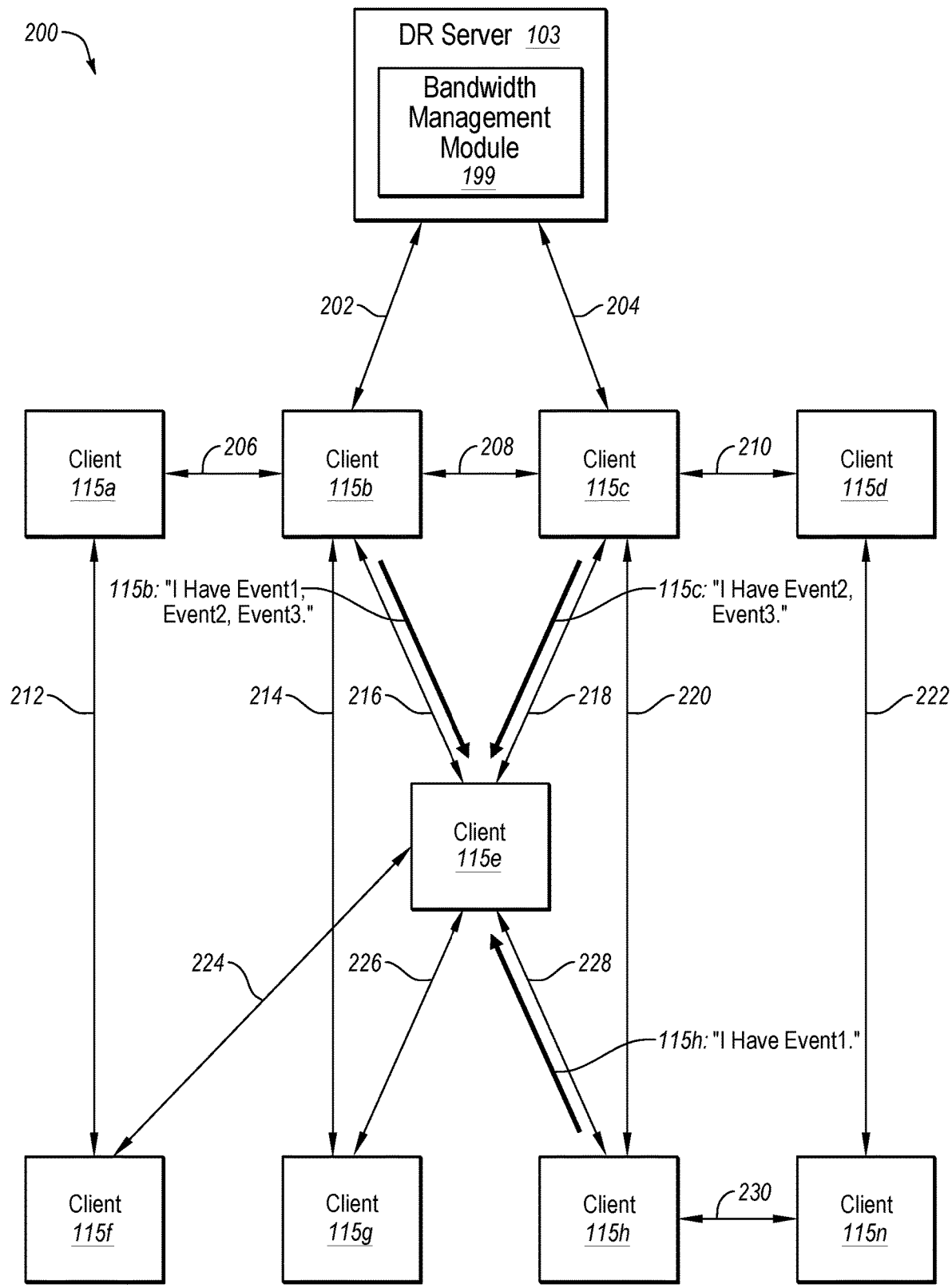
FIGS. 2-4 illustrate an example architecture for data dissemination configured to reduce the processing and bandwidth load for a DR server.
Figure 3:
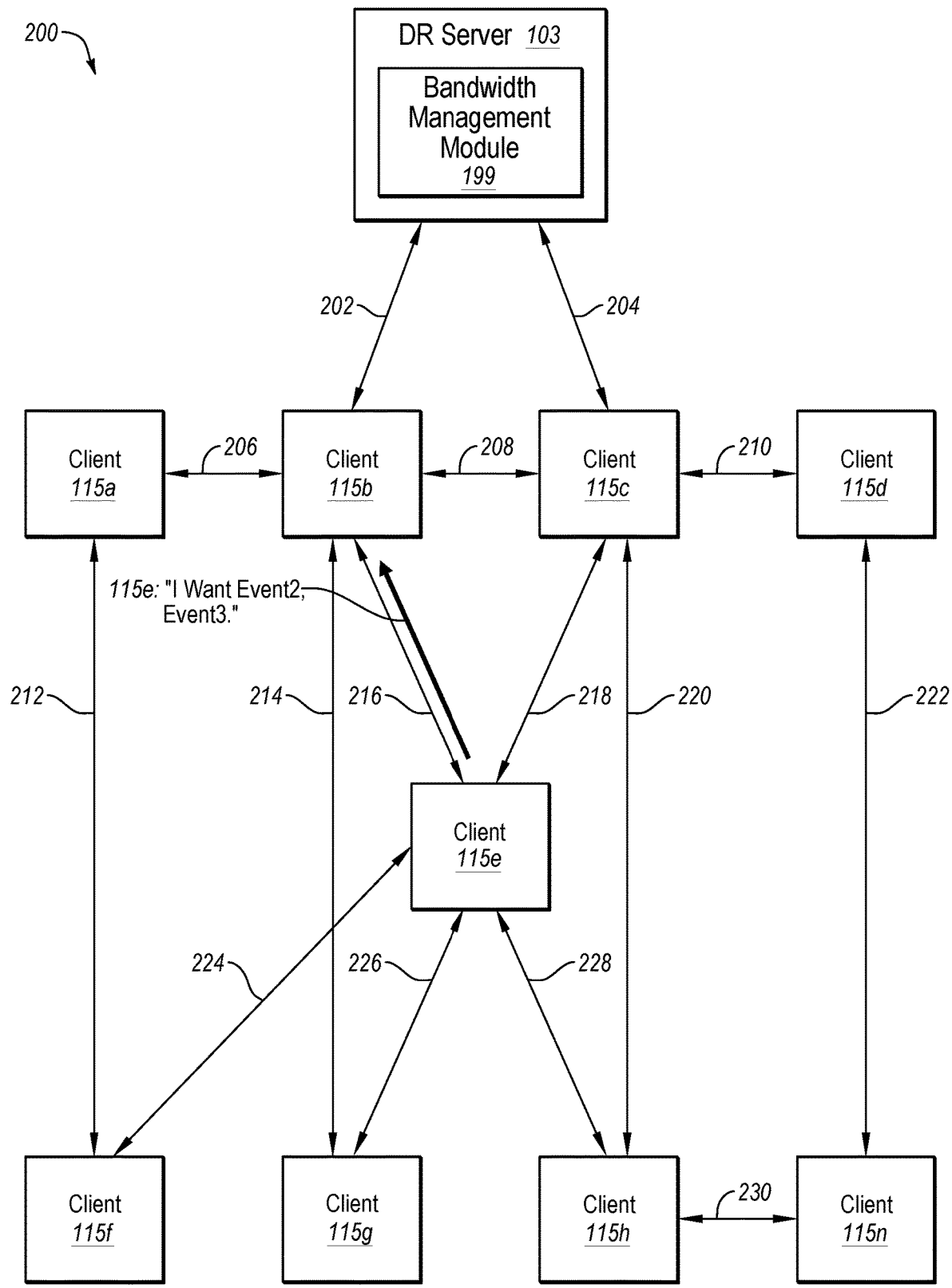
Figure 4:
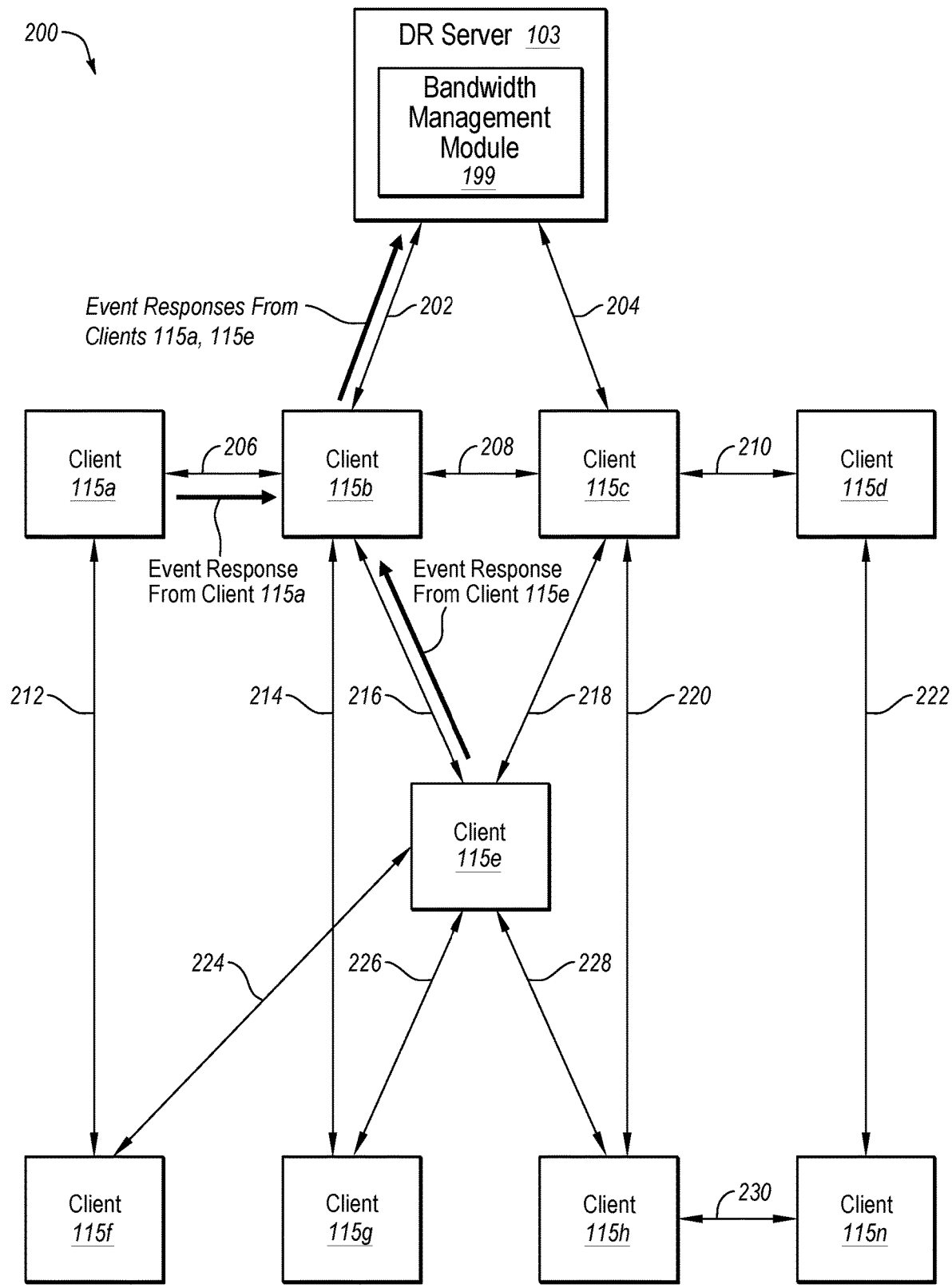

FIGS. 2-4 illustrate a block diagram of some implementations of an example architecture 200 for DR event dissemination configured to reduce the processing and bandwidth load for the DR server 103, arranged in accordance with at least one embodiment described herein. Depicted in FIGS. 2-4 are the DR server 103, the bandwidth reduction module 199 and nine client devices 115. FIGS. 2-4 depict the same architecture at different points in time. FIG. 2 occurs at a point in time before FIG. 3. FIG. 3 occurs at a point in time after FIGS. 1 and 2. FIG. 4 occurs at a point in time after FIGS. 1, 2 and 3.

Referring now to FIG. 2, the example architecture 200 is depicted. In the depicted implementation a first client device 115b, a second client device 115c and a third client device 115h are transmitting beacons to a fourth client device 115e. A beacon as used herein may refer to a signal transmitted by a client device 115. By contrast, a signal transmitted by the DR server 103 may be referred to herein as a "server beacon." For the sake of simplicity, the data included in a beacon may be referred to herein as "beacon data" and the data included in a server beacon may be referred to herein as "server beacon data."

In FIG. 2 the beacon data describes different events generated by the bandwidth reduction module 199. An "event" is a DR event generated by the bandwidth reduction module 199. In FIGS. 2-4, the events are designated as "event1," "event2" and "event3." Event1, event2 and event3 are different events generated by the bandwidth reduction module 199. For example, event1 may be an event indicating that the price for electricity is scheduled to increase at a certain time and that the client devices 115 may reduce their consumption of electricity to a specific usage. Event2 and event3 may be similar events relating to DR in an electricity grid system.

In the implementation depicted in FIG. 2, the first client device 115b transmits a beacon to the fourth client device 115e that includes beacon data indicating that the first client device 115b has data describing event1, event2 and event3. The second client device 115c transmits a beacon to the fourth client device 115e that includes beacon data indicating that the second client device 115c has data describing event2 and event3. The third client device 115h transmits a beacon to the fourth client device 115e that includes beacon data indicating that the fourth client device 115h has data describing event1. The beacon data may include announcement data. As will be described in more detail with reference to FIG. 5, the announcement data is data that describes one or more events that are generated by the bandwidth reduction module 199.

The example architecture 200 depicted in FIGS. 2-4 will now be described in more detail. In the implementation depicted in FIGS. 2-4, the nine client devices 115 are a set of peer clients associated with the DR server 103. Although each of the client devices 115 are associated with the DR server 103, only the first client device 115b and the second client device 115c are configured to directly communicate with the DR server 103. This configuration is beneficial since the DR server 103 does not have to directly communicate with each of the client devices 115, thereby reducing the bandwidth necessary for the DR server 103 to perform its function. By contrast, existing DR systems require the DR server 103 to directly communicate with each of the client devices 115 and maintain persistent contact with each of the client device 115, thereby introducing a bandwidth load on the DR server 103 that is much higher than the bandwidth load required according to the implementation depicted in FIGS. 2-4.

The bandwidth reduction module 199 determines peer data configured to reduce bandwidth requirements for the DR server 103. The peer data is data describing a set of peer clients associated with the DR server 103 and how the client devices 115 included in the set of peer clients communicate with one another. A set of peer clients is one or more client devices 115 configured to communicate with the DR server 103 and associated with the DR server 103 in a manner to receive data (e.g., peer data and announcement data) from the DR server 103. For example, in FIG. 2 the nine depicted client devices 115a-115n are the set of peer clients. The peer data is configured so that the DR server 103 does not directly communicate with each of the peer clients in the set of peer clients. However, the peer data is also configured so that the DR server 103 does directly communicate with one or more recipient peer clients. A recipient peer client is any client device 115 that is configured to directly communicate with the DR server 103. Each set of peer clients includes one or more recipient peer clients. In the example architecture 200 depicted in FIG. 2, the first client device 115b and the second client device 115c are recipient peer clients since they each communicate directly with the DR server 103.

In some instances, the peer data may include data describing a hop count between different client devices 115. A hop count is a description of the number of hops between different client devices 115. In FIG. 2, for example, client device 115n is two hops from client device 115c since the shortest communication from client device 115n to client device 115c would first have to be transmitted to client device 115d or client device 115h; client device 115d or client device 115h could then relay the transmission to client device 105c. In this example, the transmission from client device 105n to client device 115d or client device 115h is a first hop, and the transmission from client device 115d or client device 115h to client device 105c is a second hop. Accordingly, client device 115n is two hops from client device 105c since a transmission from client device 105n to client device 105c requires at least two hops.

As described above, the peer data defines how the client devices 115 included in the set of peer clients communicate with one another. The client devices 115 are configured by the peer data to communicate with other peer clients using different communication associations that are stored by each client device 115. The communication associations describe which client devices 115 communicate with one another. For example, client device 115e is configured to communicate with client devices 115b, 115c, 115f, 115g and 115h. The communication associations between client device 115e and client devices 115b, 115c, 115f, 115g and 115h is indicated in FIG. 2 by elements 216, 218, 224, 226 and 228, respectively. The other communication associations depicted in FIGS. 2-4 are described below.

Client device 115a is configured to communicate with client devices 115b and 115f, as indicated by communication associations 206 and 212, respectively. Client device 115b is configured to communicate with client devices 115a, 115c, 115e and 115g, as indicated by communication associations 206, 208, 216 and 214, respectively. Client device 115b is also configured to communicate with the DR server 103, as indicated by communication association 202. Client device 115c is configured to communicate with client devices 115b, 115d, 115e and 115h, as indicated by communication associations 208, 210, 218 and 220, respectively. Client device 115c is also configured to communicate with the DR server 103, as indicated by communication association 204.

Client device 115d is configured to communicate with client devices 115c and 115n, as indicated by communication associations 210 and 222, respectively. Client device 115d is configured to communicate with client devices 115c and 115n, as indicated by communication associations 210 and 222, respectively. Client device 115f is configured to communicate with client devices 115a and 115e, as indicated by communication associations 212 and 224, respectively. Client device 115g is configured to communicate with client devices 115b and 115e, as indicated by communication associations 214 and 226, respectively. Client device 115h is configured to communicate with client devices 115e, 115c and 115n, as indicated by communication associations 228, 220 and 230, respectively. Client device 115n is configured to communicate with client devices 115d and 115h, as indicated by communication associations 222 and 230, respectively.

The bandwidth reduction module 199 generates announcement data describing an event for the set of peer clients. For example, the bandwidth reduction module 199 generates announcement data describing event1, event2 and event3. The recipient peer clients 115b, 115c are associated with a subset of the peer clients. For example, first client device 115b is associated with client devices 115a, 115e and 115g. The second client device 115c is associated with client devices 115d, 115e and 115h. The DR server 103 transmits a beacon to the recipient peer clients 115b, 115c. The recipient peer clients 115b, 115c then transmit the announcement data to the client devices 115 with which they have a communication association. For example, recipient peer client 115c receives the announcement data from the DR server 103 and then transmits the announcement data to client devices 115b, 115d, 115e and 115h. The client devices 115 which receive the announcement data from the recipient peer clients 115b, 115c then send out beacons to the client devices 115 they are associated with to inform these client devices 115 about the event described in the announcement data; these client devices 115 may in turn request the announcement data from the client devices 115 who have already received the announcement data.

For example, the recipient peer client 115c transmits beacon data to client device 115h informing the client device 115h of one or more events the recipient peer client 115c has information about. The client device 115h analyzes the events received from recipient peer client 115c to determine whether any events are missing from the announcement data stored by the client device 115h. For example, the client device 115h retrieves announcement data stored in a memory of the client device 115h and cross references the events described by this announcement data against the events received from recipient peer client 115c to determine whether any events are missing. Upon determining that the recipient peer client 115c has information about an event which the client device 115h does not have information about (i.e., "a missing event"), the client device 115h sends a beacon to the recipient peer client 115c requesting information about the missing event. The recipient peer client 115c transmits a beacon to the client device 115h including beacon data describing the missing event.

The client device 115h repeats the process described in the preceding paragraph with client devices 115e and 115n since client device 115h has a communication association with these client devices 115e and 115n. For example, the client device 115h transmits a beacon to the client 115n including a description of one or more events which the client 115h has information about. The client 115n determines whether there is a missing event and, if so, the client device 115n transmits a beacon to the client device 115h including a request for information about the missing event. This process may be repeated until each of the client devices 115 included in the set of peer clients has all of the events generated by the bandwidth reduction module 199. In this way, all the client devices 115 included in the set of peer clients receive information about all the events generated by the bandwidth reduction module 199 even though the peer data is configured so that the DR server 103 does not directly communicate with each of the client devices 115 included in the set of peer clients. Instead, the DR server 103 directly communicates with only a subset of the peer clients (i.e., the recipient peer clients 115b, 115c).

The client devices 115 included in the set of peer clients transmit beacons including event response data indicating their participation in one or more events described by the announcement data. The event response data is transmitted directly or indirectly to the DR server 103 in a similar manner as the announcement data is transmitted from the DR server 103 to the client devices 115. This concept is described in further detail below with reference to FIGS. 5-10A.

In some implementations, the data included in the beacons described above is encrypted. The encryption of this data will be described in more detail with reference to FIGS. 5-10A.

Referring now to FIG. 3, the example architecture 200 is depicted at a moment in time occurring after the moment in time depicted in FIG. 2. In the implementation depicted in FIG. 3, the fourth client 115e transmits a beacon to the first client device 115b that includes beacon data indicating that the fourth client device 115e is requesting data describing event2 and event3.

Referring now to FIG. 4, the example architecture 200 is depicted at a moment in time occurring after the moment in time depicted in FIG. 3. In the implementation depicted in FIG. 4, the client devices 115a, 115b and 115e are communicating with one another to transmit beacons including event response data to the DR server 103. A fifth client 115a transmits a beacon including event response data to the first client 115b. The fourth client 115e transmits a beacon including event response data to the first client 115b. The first client 115b transmits a beacon including event response data from the fourth client 115e and the fifth client 115a to the DR server 103. In some implementations, the data included in one or more of the beacons described above is encrypted. The encryption of the event response data will be described in more detail with reference to FIGS. 5-10A.

Figure 5:
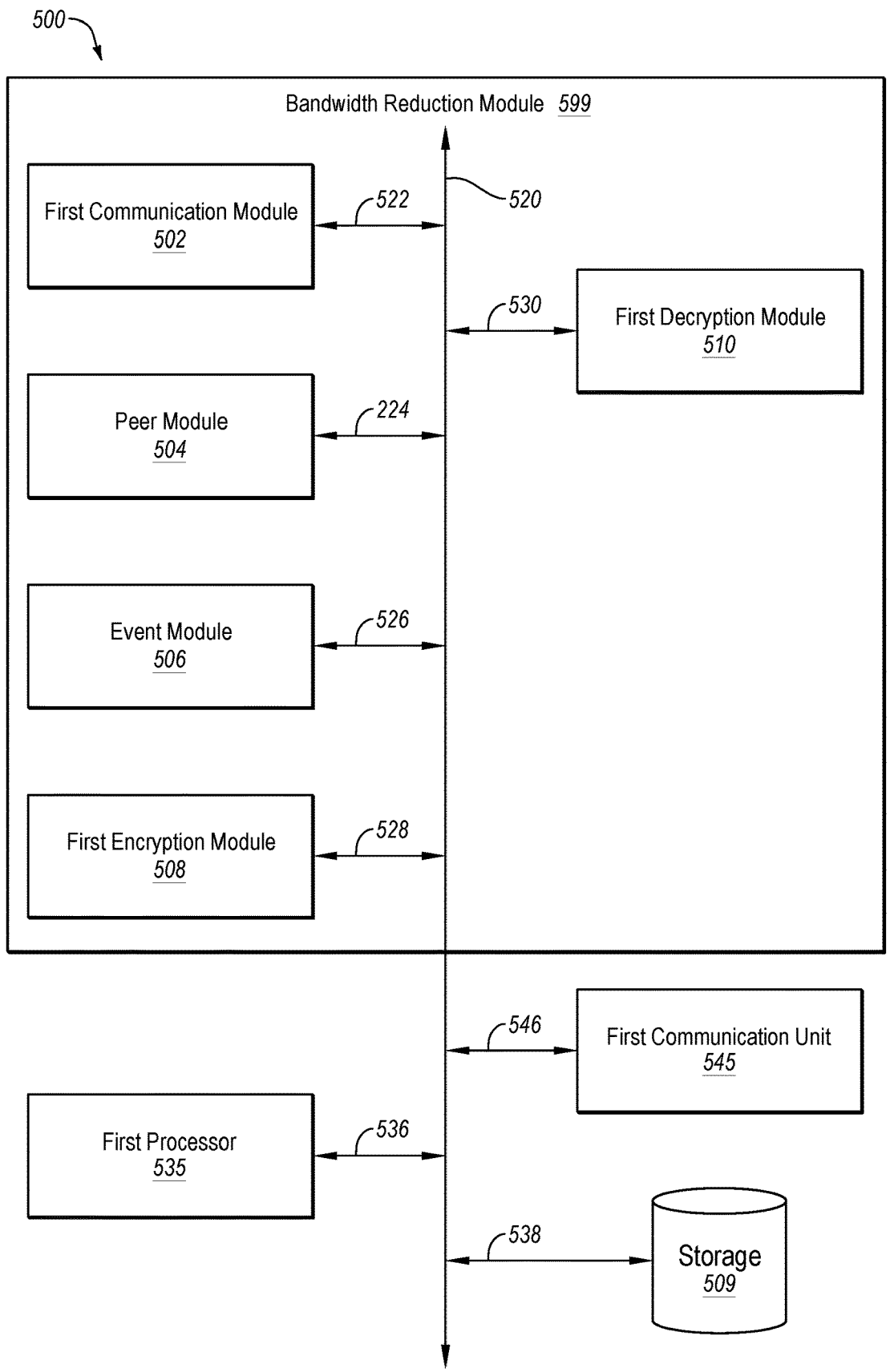
FIG. 5 is an example bandwidth reduction module.

Referring now to FIG. 5, an example of the bandwidth reduction module 199 is illustrated in accordance with at least one embodiment described herein. FIG. 5 is a block diagram of a computing device 500 that includes a bandwidth reduction module 599, a first processor 535, a storage 509 and a first communication unit 545 according to some examples. The components of the computing device 500 are communicatively coupled by a bus 520. In some implementations, the computing device 500 may be a DR server, such as the DR server 103 of FIGS. 1-4 or a client device, such as the client device 115 of FIGS. 1-4. The bandwidth reduction module 599 and the storage 509 may be similar to the bandwidth reduction module 199 of FIGS. 1-4 and the storage 109 of FIG. 1, respectively.

The first processor 535 may include an arithmetic logic unit, a microprocessor, a general purpose controller or some other processor array to perform computations and provide electronic display signals to a display device. The first processor 535 is coupled to the bus 520 for communication with the other components via signal line 536. The first processor 535 may process data signals and may include various computing architectures including a complex instruction set computer (CISC) architecture, a reduced instruction set computer (RISC) architecture, or an architecture implementing a combination of instruction sets. Although FIG. 5 includes a single processor 535, multiple processors may be included. Other processors, operating systems, sensors, displays and physical configurations may be possible.

The storage device 509 stores instructions or data that may be executed by the first processor 535. The storage device 509 is coupled to the bus 520 for communication with the other components via signal line 538. The instructions or data may include code for performing the techniques described herein.

The first communication unit 545 may transmit data to at least one of a client device and a DR server depending upon where bandwidth reduction module 599 may be stored. The first communication unit 545 may receive data from one of a client device and a DR server depending upon where bandwidth reduction module 599 may be stored. The first communication unit 545 is coupled to the bus 520 via signal line 546. In some implementations, the first communication unit 545 includes a port for direct physical connection to a network, such as a network 105 of FIG. 1 or to another communication channel. For example, the first communication unit 545 may include a port such as a USB, SD, RJ45 or similar port for wired communication with a client device. In some implementations, the first communication unit 545 includes a wireless transceiver for exchanging data with the client device or other communication channels using one or more wireless communication methods, including IEEE 802.11, IEEE 802.16, BLUETOOTH® or another suitable wireless communication method.

In some implementations, the first communication unit 545 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the first communication unit 545 includes a wired port and a wireless transceiver. The first communication unit 545 also provides other conventional connections to a network for distribution of data using standard network protocols including TCP/IP, HTTP, HTTPS and SMTP, etc.

In the implementation illustrated in FIG. 5, the bandwidth reduction module 599 includes a first communication module 502, a peer module 504, an event module 506, a first encryption module 508 and a first decryption module 510.

These components of the bandwidth reduction module 599 are communicatively coupled to each other via the bus 520.

The first communication module 502 is communicatively coupled to the bus 520 via signal line 522. The peer module 504 is communicatively coupled to the bus 520 via signal line 524. The event module 506 is communicatively coupled to the bus 520 via signal line 526. The first encryption module 508 is communicatively coupled to the bus 520 via signal line 528. The first decryption module 510 is communicatively coupled to the bus 520 via signal line 530.

The first communication module 502 may be software including routines for handling communications between the bandwidth reduction module 599 and other components of the computing device 500. In some implementations, the first communication module 502 may be a set of instructions executable by the first processor 535 to provide the functionality described below for handling communications between the bandwidth reduction module 599 and other components of the computing device 500. In some instances, the first communication module 502 may be stored in the storage device 509 of the computing device 500 and may be accessible and executable by the first processor 535.

The first communication module 502 sends and receives data, via the first communication unit 545, to and from one or more of a client device and a DR server.

In some implementations, the first communication module 502 receives data from components of the bandwidth reduction module 599 and stores the data in the storage device 509. In some implementations, the first communication module 502 retrieves data from the storage device 509 and sends the data to one or more appropriate components of the bandwidth reduction module 599. In some implementations, the first communication module 502 receives data from one or more appropriate components of the bandwidth reduction module 599 or the storage device 599 and sends the data to other components of a system communicatively coupled to the computing device 500, such as components in the system 100 depicted in FIG. 1. The first communication module 502 may be adapted for cooperation and communication with the first processor 535 and other components of the computing device 500 via signal line 522.

The peer module 504 may be software including routines for determining peer data. In some implementations, the peer module 504 may be a set of instructions executable by the first processor 535 to provide the functionality described herein for determining peer data. The peer module 504 may communicate with the first communication module 504 to store the peer data in the storage device 509. The peer module 504 may communicate with the first communication module 502 to transmit the peer data to client devices. For example, the first communication module 502 may transmit the peer data to the recipient peer clients.

In some implementations, the peer module 504 may be stored in the storage device 509 of the computing device 500 and may be accessible and executable by the first processor 535. The peer module 504 may be adapted for cooperation and communication with the first processor 535 and other components of the computing device 500 via signal line 524.

The event module 506 may be software including routines for determining announcement data. In some implementations, the event module 506 may be a set of instructions executable by the first processor 535 to provide the functionality described herein for determining announcement data. The event module 506 may communicate with the first communication module 502 to store the announcement data in the storage device 509. The event module 506 may communicate with the first communication module 502 to transmit the announcement data to the client devices. For example, the first communication module 502 may transmit the announcement data to one or more recipient peer clients.

In some implementations, the event module 506 may be stored in the storage device 509 of the computing device 500 and may be accessible and executable by the first processor 535. The event module 506 may be adapted for cooperation and communication with the first processor 535 and other components of the computing device 500 via signal line 526.

The first encryption module 508 may be software including routines for encrypting data transmitted by the first communication module 502. For example, the first encryption module 508 encrypts peer data and announcement data transmitted by the first encryption module 508 to one or more client devices. In some implementations, the first encryption module 508 may be a set of instructions executable by the first processor 535 to provide the functionality described herein for encrypting data. The first encryption module 508 may communicate with the first communication module 502 to retrieve data stored on the storage device 509 and store encrypted data in the storage device 509. The first encryption module 508 may communicate with the first communication module 502 to transmit the encrypted data to client devices. For example, the first communication module 502 may transmit encrypted peer data or encrypted peer data to the recipient peer clients.

In some implementations, the first encryption module 508 encrypts data using a public key infrastructure. For example, the DR server 103 has its own public key and digital certificate that are known and trusted by each of the client devices 115, which are associated with the DR server 103. In some implementations, the private key of the DR server 103 is only known by the DR server 103. The client devices 115 included in the set of peer clients may know and trust the public key pair and digital certificate associated with the DR server 103. This example assumes that first encryption module 508 is an element of the DR server 103, however, it may be understood that in some implementations the first encryption module 508 may be an element of a client device.

In some implementations, the first encryption module 508 establishes a pairwise shared secret key with each of the client devices 115 that are associated with the DR server. The first encryption module 508 may cooperate with the first communication module 502 to establish a pairwise shared secret key with the client devices 115 included in the set of peer clients. In other implementations, the first encryption module 508 encrypts data using a symmetric-key encryption scheme, which may be beneficial since it may minimize computational overhead for the DR server 103 and the client devices 115 that are associated with the DR server 103.

In some implementations, the DR server 103 executes different demand response programs ("DR programs"). A DR program may be any program implemented by the DR server 103. For example, the DR program may be an energy management program implemented by the DR server 103.

In some instances, the first encryption module 508 may establish different shared secret keys for each of the different DR programs. For example, different client devices 115 communicate with the DR server 103 to register for different DR programs. For each DR program, the DR server 103 may maintain a different digital certificate, pairwise shared secret key and DR program key. After a particular client device 115 has registered for a particular DR program, the DR server 103 transmits the corresponding digital certificate, pairwise shared secret key and DR program key to the client device 115. The transmission of the digital certification, pairwise shared secret key and DR program key may occur as an out-of-band communication.

In some implementations, the DR server 103 may maintain the same digital certificate and pairwise shared secret key for each DR program, but different DR program keys for different DR programs. In some instances, one or more of the digital certificate, pairwise shared secret key and DR program key are different for each DR program. In other words, for each DR program, any combination of the digital certificate, pairwise shared secret key and DR program key may be different relative to another DR program. For example, the first encryption module 508 may generate different shared secret keys for each DR program.

The first encryption module 508 may encrypt peer data. For example, the first encryption module 508 encrypts the peer data using a public key infrastructure. Encrypting the peer data using a public key infrastructure is beneficial since only the DR server 103 is able to define peers. Similarly, the first encryption module 508 may encrypt announcement data. For example, the first encryption module 508 encrypts the announcement data using a public key infrastructure so that only DR server 103 is able to generate events. In some instances the first encryption module 508 encrypts the announcement data using different public keys for different client devices 115 included in the set of peer clients. The first encryption module 508 may encrypt the peer data and the announcement data using any other encryption method.

The first communication module 502 may transmit the peer data or the announcement data in a server beacon. As described above with reference to FIG. 2, a "server beacon" is a signal transmitted by the DR server 103 while a "beacon" is a signal transmitted by a client device 115. The server beacon may include server beacon data which describes, among other things, the peer data or the announcement data. For example, assume the DR server 103 generates an event which is described by announcement data associated with the event. The first communication module 502 transmits a server beacon to a recipient peer client that includes server beacon data associated with the event. In this example, the server beacon data includes the announcement data describing the event.

In some implementations, the storage device 509 stores data indicating that the event is associated with an event identifier (referred to herein as an "Event ID") and the recipient peer client is associated with a recipient identifier (referred to herein as a "Recipient ID"). The Event ID and the Recipient ID may be stored in the storage device 509.

In some implementations, a tuple may be included in a server beacon associated with an event. For example, assume the DR server 103 generates an event that is described by announcement data. The first communication module 502 transmits a server beacon to a recipient peer client that includes the announcement data describing the event. The event is identified by an Event ID and the recipient peer client is identified by a Recipient ID. The server beacon data may include a tuple describing the event. For example, the announcement data may include the tuple formed by an ordered list of the Recipient ID and Event ID, such as {Event ID, Recipient ID} or {Recipient ID, Event ID}.

In some implementations, the Recipient ID may identify a particular DR program instead of identifying a particular client device 115. In some instances, the announcement data is encrypted with a shared secret key corresponding to the Recipient ID. In other instances, the transmission of the server beacon is signed by the first encryption module 508 using a private key associated with the DR server 103. Signing the server beacon with a private key associated with the DR server 103 is beneficial, for example, because it ensures that only the DR server 103 may issue a transmission that is acted on by a client device 115 associated with the DR server 103.

In some implementations, the server beacon data includes a set of beacon parameters. The beacon parameters may be included as an element of the peer data. The beacon parameters may also be a set of data that is separate from the peer data. The beacon parameters may describe how frequently the different peer clients may send beacons to one another, for example, as described above with reference to FIG. 2-4. The beacon parameters may also include data changing how the peer clients are associated with one another. For example, the beacon parameters may include update peer data. Update peer data is peer data that changes the communication associations among the different client devices 115 included in the set of peer clients.

In some implementations, the first encryption module 508 may be stored in the storage device 509 of the computing device 500 and may be accessible and executable by the first processor 535. The first encryption module 508 may be adapted for cooperation and communication with the first processor 535 and other components of the computing device 500 via signal line 528.

The first encryption module 508 may be software including routines for encrypting data transmitted by the first communication module 502. For example, the first encryption module 508 encrypts peer data and announcement data transmitted by the first encryption module 508 to one or more client devices 115. In some implementations, the first encryption module 508 may be a set of instructions executable by the first processor 535 to provide the functionality described herein for encrypting data. The first encryption module 508 may communicate with the first communication module 502 to retrieve data stored on the storage device 509 and store encrypted data in the storage device 509. The first encryption module 508 may communicate with the first communication module 502 to transmit the encrypted data to the client devices 115. For example, the first communication module 502 may transmit encrypted peer data to the recipient peer clients.

The first decryption module 510 may be software including routines for decrypting data. In some implementations, the first decryption module 510 may be a set of instructions executable by the first processor 535 to provide the functionality described herein for decrypting data. The first decryption module 510 may communicate with the first communication module 502 to retrieve encrypted data stored on the storage device 109 and store decrypted data in the storage device 109. The decrypted data may be a decrypted equivalent (or version) of the encrypted data. For example, the first communication module 502 may receive encrypted event response data from a recipient peer client as described above with reference to FIG. 4. The first communication module 502 transmits the encrypted event response data to the first decryption module 510. The first decryption module 510 decrypts the event response data. The first decryption module 510 communicates with the first communication module 502 to store the decrypted event response data on the storage device 109.

In some implementations, the first decryption module 510 may be stored in the storage device 109 of the computing device 500 and may be accessible and executable by the first processor 535. The first decryption module 510 may be adapted for cooperation and communication with the first processor 535 and other components of the computing device 500 via signal line 530.

Figure 6A:
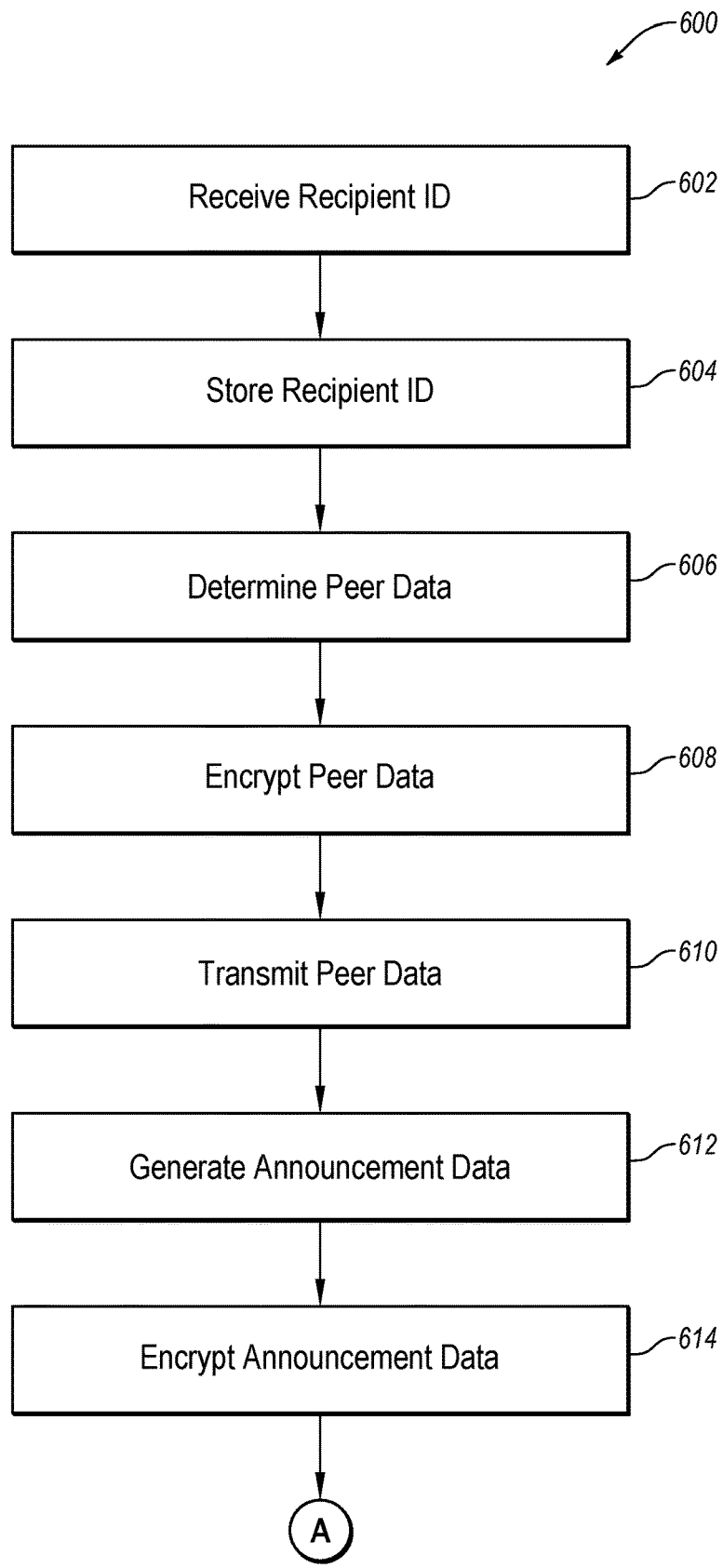

Referring now to FIGS. 6A and 6B, an example of a method 600 for determining peer data and announcement data is described, in accordance with at least one embodiment described herein. The method 600 is described with respect to FIGS. 1-6. Although illustrated as discrete blocks, various blocks may be divided into additional blocks, combined into fewer blocks, or eliminated, depending on the desired implementation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In the illustrated implementation of FIG. 6A, the method 600 may include the first communication module 502 receiving 602 a Recipient ID from a client device 115. The first communication module 502 stores 604 the Recipient ID in the storage device 509. The storage device 509 may store one or more Recipient IDs. The peer module 504 determines 606 peer data for a set of peer clients. The first encryption module 508 encrypts 608 the peer data. The encrypted peer data is transmitted 610. The event module 506 generates 612 announcement data describing one or more events. The first encryption module 508 encrypts 614 the announcement data.

Referring now to FIG. 6B, the first communication module 502 transmits 616 encrypted announcement data. The first communication module 502 receives 618 event response data from one or more recipient peer clients. The event response data may be encrypted. The first decryption module 510 decrypts 620 the event response data. The first communication module 502 stores 622 the decrypted event response data on the storage device 509.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
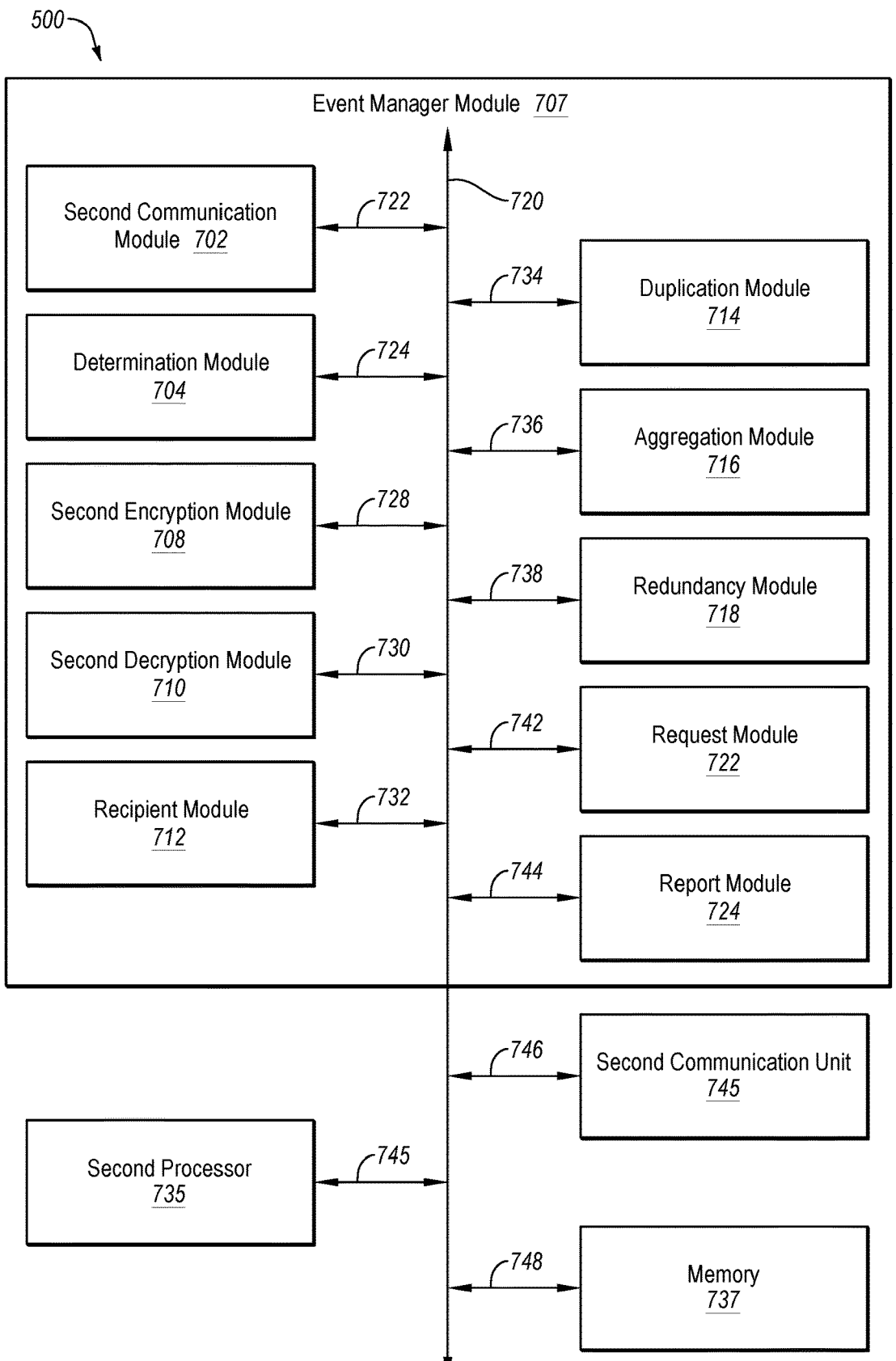
FIG. 7 is an example event manager module.

Referring now to FIG. 7, an example of an event manager module 707 is illustrated in more detail, in accordance with at least one embodiment described herein. FIG. 7 is a block diagram of a computing device 700 that includes an event manager module 707, a second processor 735, a memory 737 and a second communication unit 745 according to some examples. The components of the computing device 700 are communicatively coupled by a bus 720. In some implementations, the computing device 700 may be a DR server, such as the DR server 103 of FIGS. 1-4 or a client device, such as the client device 115 of FIGS. 1-4. The event manager module 707 may be similar to the event manager module 107 of FIGS. 1-4.

The second processor 735 includes features similar to the first processor 535. The features of the first processor 535 are described above with reference to FIG. 5. Accordingly, that description will not be repeated here. Although FIG. 7 includes a single second processor 735, multiple processors may be included. Other processors, operating systems, sensors, displays and physical configurations may be possible. The second processor 735 is coupled to the bus 720 via signal line 745.

The memory 737 stores instructions or data that may be executed by the processor 735. The instructions or data may include code for performing the techniques described herein. The memory 737 is a non-transitory computer-readable storage medium. For example, the memory 737 may be a dynamic random access memory (DRAM) device, a static random access memory (SRAM) device, flash memory or some other memory device. In some implementations, the memory 737 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 737 is coupled to the bus 720 via signal line 748.

The second communication unit 745 transmits data to at least one of the client device 115 and the DR server 103 depending on where the event manager module 707 may be stored. The second communication unit 745 may also receive data from at least one of the client device 115 and the DR server 103 depending on where the event manager module 707 may be stored. The second communication unit 745 is coupled to the bus 720 via signal line 746. The second communication unit 745 includes features similar to the first communication unit 545. The features of the first communication unit 545 are described above with reference to FIG. 5. Accordingly, that description will not be repeated here.

In the implementation illustrated in FIG. 7, the event manager module 707 includes a second communication module 702, a determination module 704, a second encryption module 708, a second decryption module 710, a recipient module 712, a duplication module 714, an aggregation module 716, a redundancy module 718, a request module 722 and a report module 724. These components of the event manager module 707 are communicatively coupled to each other via the bus 720.

The second communication module 702 is communicatively coupled to the bus 720 via signal line 722. The determination module 704 is communicatively coupled to the bus 720 via signal line 724. The second encryption module 708 is communicatively coupled to the bus 720 via signal line 728. The second decryption module 710 is communicatively coupled to the bus 720 via signal line 730. The recipient module 712 is communicatively coupled to the bus 720 via signal line 732. The duplication module 714 is communicatively coupled to the bus 720 via signal line 734. The aggregation module 716 is communicatively coupled to the bus 720 via signal line 736. The redundancy module 718 is communicatively coupled to the bus 720 via signal line 738. The request module 722 is communicatively coupled to the bus 720 via signal line 742. The report module 724 is communicatively coupled to the bus 720 via signal line 744.

The second communication module 702 may be software including routines for handling communications between the event manager module 707 and other components of the computing device 700. In some implementations, the second communication module 702 may be a set of instructions executable by the second processor 735 to provide the functionality described below for handling communications between the event manager module 707 and other components of the computing device 700. In some instances, the second communication module 702 may be stored in the memory 737 of the computing device 700 and may be accessible and executable by the second processor 735.

The second communication module 702 sends and receives data, via the second communication unit 745, to and from one or more of a client device 115 and the DR server 103.

In some implementations, the second communication module 702 receives data from components of the event manager module 707 and stores the data in the memory 737. In some implementations, the second communication module 702 retrieves data from the memory 737 and sends the data to one or more appropriate components of the event manager module 707. In some implementations, the second communication module 702 receives data from one or more appropriate components of the event manager module 707 or the memory 737 and sends the data to other components of the system 100 depicted in FIG. 1. The second communication module 702 may be adapted for cooperation and communication with the second processor 735 and other components of the computing device 700 via signal line 722.

The determination module 704 may be software that includes routines for determining beacon data. The beacon data may include any data that is transmitted by the client device 115. For example, the beacon data may include data describing one or more of beacon parameters, the shortest hop count between different client devices 115, a request for announcement data from a client device 115, an Event ID, a Recipient ID and a record indicator that the client device 115 which stores the event manager module 707 has data describing each of the events that have been generated by the DR server 103. The record indicator may be a flag indicating whether the client device 115, which stores the event manager module 707, has data describing each of the events that have been generated by the DR server 103.

In some implementations, the determination module 704 may be a set of instructions executable by the second processor 735 to provide the functionality described herein for determining beacon data. The determination module 704 may communicate with the second communication module 704 to store the beacon data in the memory 737. The determination module 704 may communicate with the second communication module 702 to transmit the beacon to one or more client devices 115 or the DR server 103.

In some implementations, the determination module 704 may be stored in the memory 737 of the computing device 700 and may be accessible and executable by the second processor 735. The determination module 704 may be adapted for cooperation and communication with the second processor 735 and other components of the computing device 700 via signal line 724.

The second encryption module 708 may be software including routines for encrypting data. The second encryption module 708 may encrypt any data accessible by the event manager module 707. For example, the second encryption module 708 encrypts beacon data, event response data, etc. The second encryption module 708 provides similar functionality as the first encryption module 508 described above with reference to FIG. 5, and so, that description will not be repeated here.

In some implementations, the second encryption module 708 may be a set of instructions executable by the second processor 735 to provide the functionality described herein for encrypting data. The second encryption module 708 may communicate with the second communication module 702 to store the encrypted data in the memory 737. The second encryption module 708 may communicate with the second communication module 702 to transmit encrypted data to one or more client devices 115 or the DR server 103. For example, the second communication module 702 may transmit encrypted beacon data to one or more client devices 115 or the DR server 103.

In some implementations, the second encryption module 708 may be stored in the memory 737 of the computing device 700 and may be accessible and executable by the second processor 735. The second encryption module 708 may be adapted for cooperation and communication with the second processor 735 and other components of the computing device 700 via signal line 728.

The second decryption module 710 may be software including routines for decrypting data. The second decryption module 710 may decrypt any encrypted data accessible by the event manager module 707. For example, the second decryption module 710 decrypts encrypted peer data, announcement data, beacon data, event response data, etc. The second decryption module 710 provides similar functionality as the first decryption module 510 described above with reference to FIG. 5, and so, that description will not be repeated here.

In some implementations, the second decryption module 710 may be a set of instructions executable by the second processor 735 to provide the functionality described herein for decrypting data. The second decryption module 710 may communicate with the second communication module 702 to store the decrypted data in the memory 737.

In some implementations, the second decryption module 710 may be stored in the memory 737 of the computing device 700 and may be accessible and executable by the second processor 735. The second decryption module 710 may be adapted for cooperation and communication with the second processor 735 and other components of the computing device 700 via signal line 730.

The recipient module 712 may be software including routines for determining a recipient for a transmission or signal. For example, the recipient module 712 determines a recipient for a beacon. The recipient module 712 may determine a recipient based on peer data generated by the bandwidth reduction module 199. For example, the recipient module 712 is an element of a first client device 115 and the peer data describes which other client devices 115 the first client device 115 can communicate with when transmitting data. The recipient module 712 analyzes the peer data to determine which client devices 115 may be the recipient of a beacon transmitted by the event manager module 707. In some instances, the recipient is a client device 115 having the lowest hop count to the DR server 103.

In some implementations, the recipient module 712 may determine a recipient based on a combination of the peer data and the announcement data generated by the bandwidth reduction module 199. For example, the event manager module 707 is an element of a first client device 115. The event manager module 707 receives a beacon from a different client device 115. The beacon includes beacon data describing which events the other client device 115 has information about. As described above with reference to FIG. 2 and determining the presence of "a missing event," the recipient module 712 analyzes the beacon data to determine whether the other client device 115 has information about an event which the first client device does not have information about. In other words, the recipient module 712 determines whether the other client device 115 has announcement data describing a missing event. In this situation, the recipient module 712 may determine the other client device 115 to be the recipient of a beacon including beacon data requesting information about the missing event.

In some implementations, the event manager module 707 is transmitting a beacon including event response data to the DR server 103. If the event manager module 707 is an element of a client device 115 that is also a recipient peer client, then the recipient module 712 determines that the DR server 103 is the recipient of a beacon including the event response data. However, if the event manager module 707 is an element of a client device 115 that is not a recipient peer client, then the recipient module 712 analyzes the peer data to determine a recipient for the beacon. For example, the recipient module 712 analyzes the peer data to determine one or more peers. In other words, as described above with reference to FIG. 2, the recipient module 712 determines the presence of communications associations among the set of peer clients. Any client device 115 with which the first client device 115 has a communication association may be referred to as a "peer" or "peer client" of the first client device 115. The recipient module 712 then determines which of the peers may be the recipient based on one or more metrics. For example, the recipient module 712 determines that the peer with the lowest hop count to the DR server 103 is the recipient.

In some implementations, the recipient module 712 may be a set of instructions executable by the second processor 735 to provide the functionality described herein for determining a recipient. The recipient module 712 may communicate with the second communication module 704 to retrieve data from the memory 737 and store data on the memory 737.

In some implementations, the recipient module 712 may be stored in the memory 737 of the computing device 700 and may be accessible and executable by the second processor 735. The recipient module 712 may be adapted for cooperation and communication with the second processor 735 and other components of the computing device 700 via signal line 732.

The duplication module 714 may be software including routines for determining the presence of duplicate data. The duplication module 714 may also delete duplicate data. For example, the event manager module 707 is an element of a first client device 115 that receives beacons from multiple other client devices 115. The beacons include event response data from the other client devices 115. Some of the event response data may include duplicate data (or "duplicates"). The duplication module 714 detects the presence of the duplicate data. The duplication module 714 deletes the duplicate data.

The concept of duplicate data will now be described in further detail. For example, assume the first client device 115 receives event response data from a second client device 115 and a third client device 115. Assume that the second and third client device 115 have event response data for a fourth client device and this event response data for the fourth client device is included in the event response data received by the first client device 115 from both the second client device 115 and the third client device 115. Since the first client device 115 receives event response data for the fourth client device 115 from both the second client device 115 and the third client device 115, the first client device 115 has duplicate event response data for the fourth client device 115. The duplication module 714 analyzes the event response data received from different client devices 115 to determine the presence of duplicates. The duplication module 714 may delete the duplicate data.

In some implementations, the duplication module 714 may be a set of instructions executable by the second processor 735 to provide the functionality described herein for determining duplicate data and deleting duplicate data. The duplication module 714 may communicate with the second communication module 702 to retrieve and delete data stored on the memory 737.

In some implementations, the duplication module 714 may be stored in the memory 737 of the computing device 700 and may be accessible and executable by the second processor 735. The duplication module 714 may be adapted for cooperation and communication with the second processor 735 and other components of the computing device 700 via signal line 734.

The aggregation module 716 may be software including routines for aggregating data. For example, the event manager module 707 is an element of a first client device 115 that receives beacons from multiple other client devices 115. The beacons include event response data from the other client devices 115. The aggregation module 716 aggregates the different event response data to form a single set of event response data that may be delivered to the DR server 103 or another client device 115. In some instances, the aggregation module 715 aggregates the event response data to form a single packet that is transmitted in a beacon to the DR server 103 or another client device 115. Aggregating the event response data is beneficial, for example, because it reduces the packet overhead for the recipient of the aggregated event response data.

In some implementations, the aggregation module 716 may be a set of instructions executable by the second processor 735 to provide the functionality described herein for determining aggregating data. The aggregation module 716 may communicate with the second communication module 704 to retrieve and delete data stored on the memory 737.

In some implementations, the aggregation module 716 may be stored in the memory 737 of the computing device 700 and may be accessible and executable by the second processor 735. The aggregation module 716 may be adapted for cooperation and communication with the second processor 735 and other components of the computing device 700 via signal line 736.

The redundancy module 718 may be software including routines for determining whether redundant event response data may be transmitted. For example, the event manager module 707 is an element of a first client device 115 that transmits a beacon including event response data for the first client device 115. The beacon is transmitted to a peer client. The beacon may also include event response data from multiple other client devices 115 as described above with reference to the aggregation module 716. In some instances, it may be beneficial to transmit multiple beacons including this event response data to different peer clients since, for example, sending multiple beacons may create a redundancy that increases the likelihood that the DR server 103 receives the event response data. The redundancy module 718 may determine whether a beacon including the event response data has been sent. The redundancy module 718 may also determine whether additional beacons including the event response data may be sent in order to create a redundancy. For example, the beacon parameters generated by the bandwidth reduction module 199 indicate that the event manager module 707 may transmit a certain number of beacons including the event response data and the redundancy module 718 ensures that event manager module 707 transmits additional beacons based on the beacon parameters.

In some implementations, the redundancy module 718 may be a set of instructions executable by the second processor 735 to provide the functionality described herein for determining whether redundant event response data is to be transmitted. The redundancy module 718 may communicate with the second communication module 704 to retrieve and delete data stored on the memory 737.

In some implementations, the redundancy module 718 may be stored in the memory 737 of the computing device 700 and may be accessible and executable by the second processor 735. The redundancy module 718 may be adapted for cooperation and communication with the second processor 735 and other components of the computing device 700 via signal line 738.

The request module 722 may be software including routines for generating an event request. The event request includes data requesting information about a missing event. For example, assume the request module 722 is an element of a first client device 115. The memory 737 stores announcement data describing the events which the first client device 115 has information about. The event manager module 707 receives a beacon from a second client device 115 including announcement data describing events that the first client device 115 does not have information about. In other words, the beacon includes announcement data describing a missing event. The recipient module 712 determines the presence of the missing event. The request module 722 generates an event request including data describing a request for announcement data describing the missing event. The event request can be transmitted to the second client device 115 as a beacon. The request module 722 provides other functionality described below with reference to FIGS. 10A and 10B.

In some implementations, the request module 722 may be a set of instructions executable by the second processor 735 to provide the functionality described herein for generating event requests. The request module 722 may communicate with the second communication module 704 to retrieve data stored on the memory 737 and save data to the memory 737.

In some implementations, the request module 722 may be stored in the memory 737 of the computing device 700 and may be accessible and executable by the second processor 735. The request module 722 may be adapted for cooperation and communication with the second processor 735 and other components of the computing device 700 via signal line 742.

The report module 724 may be software including routines for generating reports. In some instances, the client device 115 includes hardware or software configured to monitor the electricity consumption of the client device 115 or an electrical device associated with the client device 115. The client device 115 may be configured to monitor two or more electrical devices. The client device 115 may be configured to provide telemetry data describing the monitored events to the DR server 103. The reports generated by the report module 724 may describe the telemetry data associated with the client device 115. For example, the reports describe the electricity consumption or historical load of the client device 115 or an electrical device monitored by the client device 115. The reports may be included in the beacon data generated by the request module 722 or by report data generated by the report module 724.

The reports generated by the report module 724 are beneficial, for example, because they enable DR programs to be updated or improved by providing the DR server 103 with information about the electricity consumption or historical load of the client device 115 or an electrical device monitored by the client device 115. Since the DR server 103 may receive reports from each of the client devices 115 included in the set of peer clients, the DR server 103 may have information about the electricity consumption or historical load for each of the client devices 115 included in the set of peer clients. The reports generated by the report module 724 may describe other metrics associated with the client device 115 or an electrical device monitored by the client device.

In some implementations, the report module 724 may generate an event log. For example, the event manager module 707 is an element of a first client 115. The event log may include data describing the events which the first client device 115 has information about. For example, the second communication module 702 retrieves the announcement data stored on the memory 737 and the report module 724 uses the announcement data to generate an event log describing each of the events which the first client device 115 has information about. In some instances, the data describing the report may include an identifier indicating that the event log is a complete record of all the events that have been generated by the DR server 103. For example, the report includes a flag indicating that the event log includes a complete record of all the events that have been generated by the DR server 103.

In some implementations, the report module 724 may be a set of instructions executable by the second processor 735 to provide the functionality described herein for generating reports. The report module 724 may communicate with the second communication module 704 to retrieve data stored on the memory 737 and save data to the memory 737.

In some implementations, the report module 724 may be stored in the memory 737 of the computing device 700 and may be accessible and executable by the second processor 735. The report module 724 may be adapted for cooperation and communication with the second processor 735 and other components of the computing device 700 via signal line 744.

Figure 8:
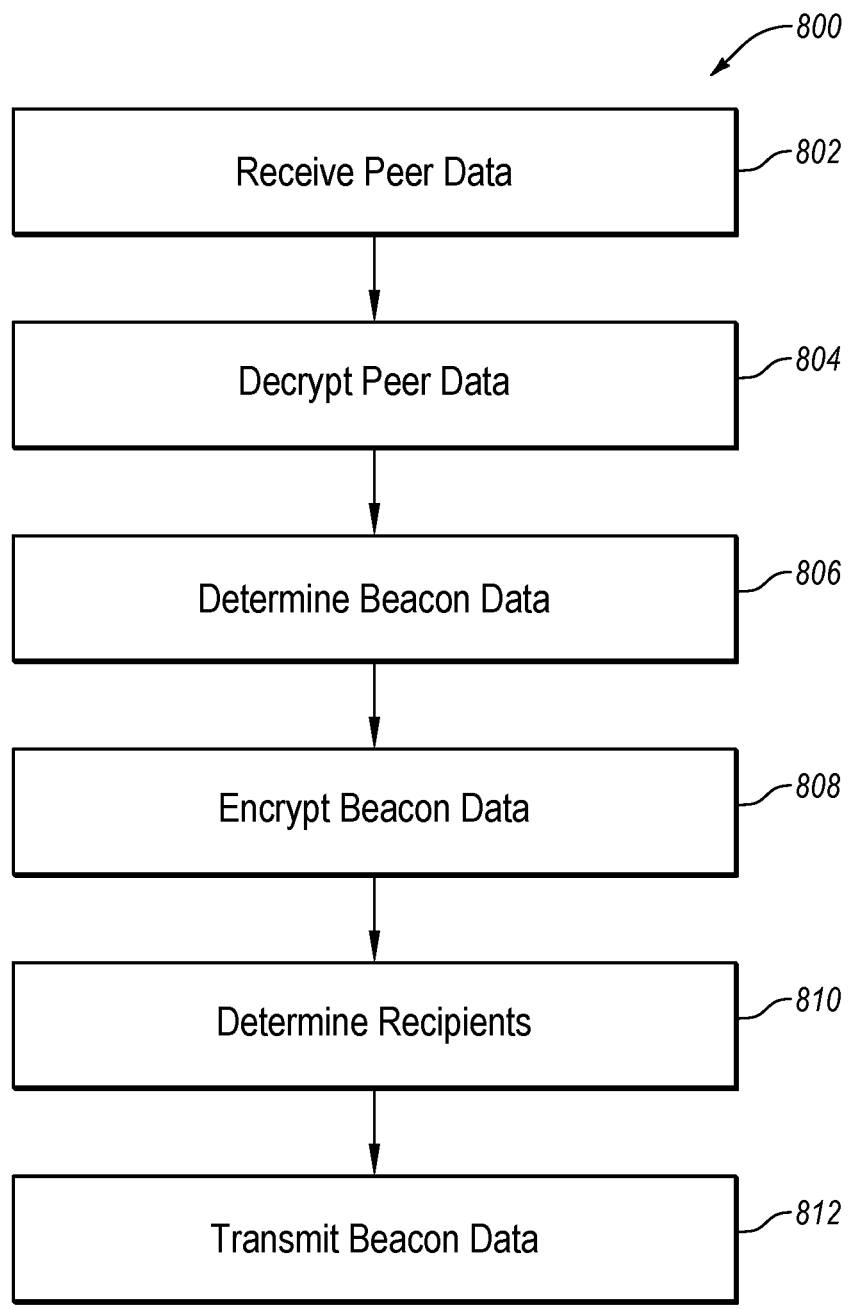
FIG. 8 illustrates an example method for determining beacon data.

Referring now to FIG. 8, an example of a method 800 for determining beacon data is described, in accordance with at least one embodiment described herein. The method 800 is described in combination with FIGS. 1-4 and 7. In the illustrated implementation, the method 800 may include the second communication module 702 receiving 802 peer data from the DR server 103 or a client device 115. The peer data may be included in a server beacon received from the DR server 103 or another client device 115. The second decryption module 710 decrypts 804 the peer data. The determination module 704 determines 806 beacon data. The beacon data determined by the determination module 704 may include the peer data. For example, the client manager module 707 is an element of a first client device 115. The peer data describes that one or more client devices 115 has one or more peer clients. The client manager module 707 needs to relay the peer data to a peer client so that the peer client has the peer data. The determination module 704 determines 806 beacon data that includes the peer data so that the beacon data may be transmitted to the peer client.

The second encryption module 708 encrypts 808 the beacon data. The recipient module 712 determines 810 a recipient for the beacon data. The second communication module 802 transmits 812 a beacon including the beacon data to the recipient.

Figure 9A:
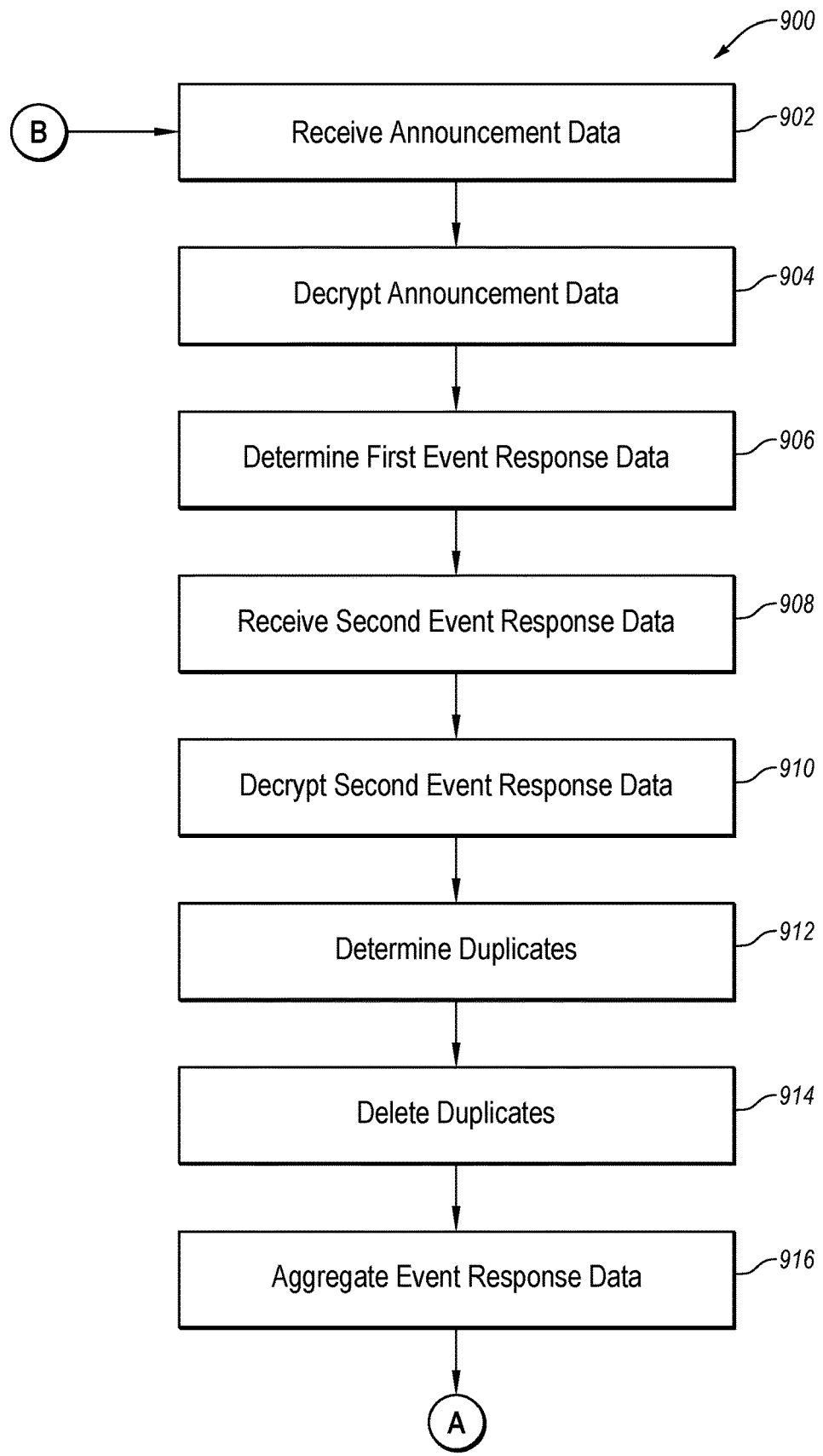
FIGS. 9A and 9B illustrate an example method for determining event response data.
Figure 9B:
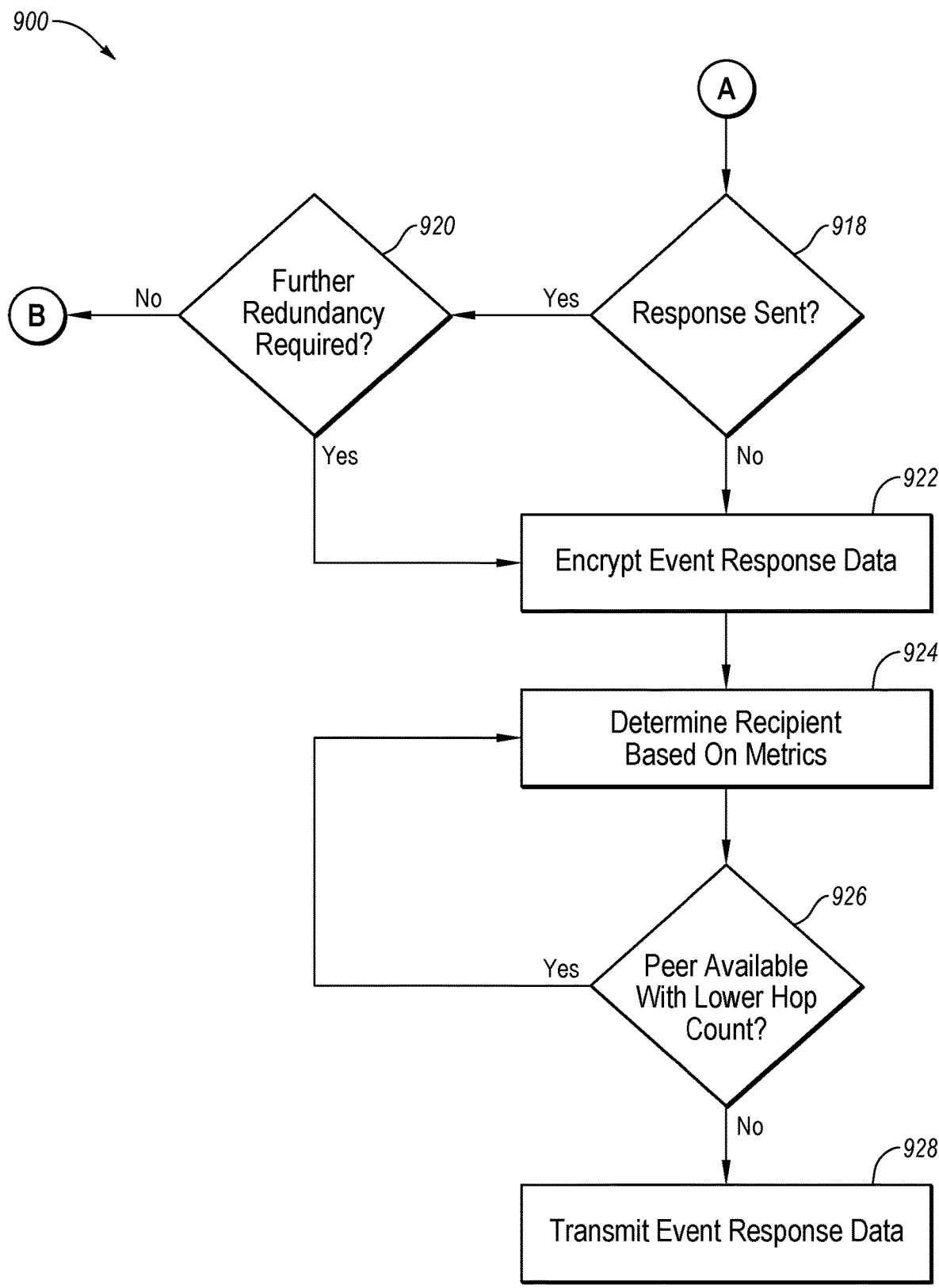

Referring now to FIGS. 9A and 9B, an example of a method 900 for determining event response data is described, in accordance with at least one embodiment described herein. The method 900 is described in combination with FIGS. 1-4 and 7.

As illustrated in FIG. 9A, the method 900 may include the second communication module 702 receiving 902 announcement data from the DR server 103 or a first client device 115. The second decryption module 710 decrypts 904 the announcement data. The determination module 704 determines 906 a first set of event response data associated with the announcement data. For example, the client manager module 707 is an element of a first client device 115 and the first set of event response data determined at step 906 describes whether the first client device 115 participates in the event described by the announcement data. The first set of event response data may also include a report generated by the report module 724. In other words, in some instances a report is a response to an event.

The second communication module 702 receives 908 a second set of event response data from a second client device 115. The second set of event response data may include event response data from one or more client devices 115. The second decryption module 710 decrypts 910 the second set of event response data. The second communication module 702 may receive additional sets of event response data from other second clients 115. The duplication module 714 determines 912 the presence of duplicates among the event response data received from the one or more second clients 115. The duplication module 714 deletes 914 any duplicates included in the second set of event response data so that the second set of event response data does not include any duplicates. The aggregation module 716 aggregates 916 the first set of event response data and the second set of event response data.

Referring now to FIG. 9B, the redundancy module 718 determines 918 whether the event manager module 707 has transmitted a beacon responsive to the announcement data. If a response has been sent, then the method 900 moves to step 920. At step 920 the redundancy module 718 determines 920 whether additional responses for the announcement data are scheduled to be sent to other recipients. If the redundancy module 718 determines that additional responses are scheduled to be sent, then the method 900 moves to step 922. If the redundancy module 718 determines that additional responses are not scheduled to be sent, then the method 900 ends.

If at step 918 the redundancy module 718 determines 918 that a response has not been sent, then the method 900 moves to step 922. At step 922 the second encryption module 728 encrypts the aggregated event response data. The recipient module 712 determines 924 a recipient from among the peer clients for the first client device 115.

The recipient module 712 determines 926 whether any of the peer clients for the first client device 115 has a lower hop count than the recipient determined at step 924. If at step 926 the recipient module 712 determines the presence of a peer client with a lower hop count than the recipient identified at step 924, then the method returns to step 924 where the first recipient may be excluded from being selected a second time by the recipient module 712. If at step 926 the recipient module 712 does not determine the presence of a peer client with a lower hop count than the recipient identified at step 924, then the method 900 moves to step 928. The recipient identified at step 924 may be the DR server 103.

At step 928 the second communication module 702 transmits 928 a beacon including the aggregated event response data to the recipient. The aggregated event response data may be encrypted as described for step 922.

Figure 10A:
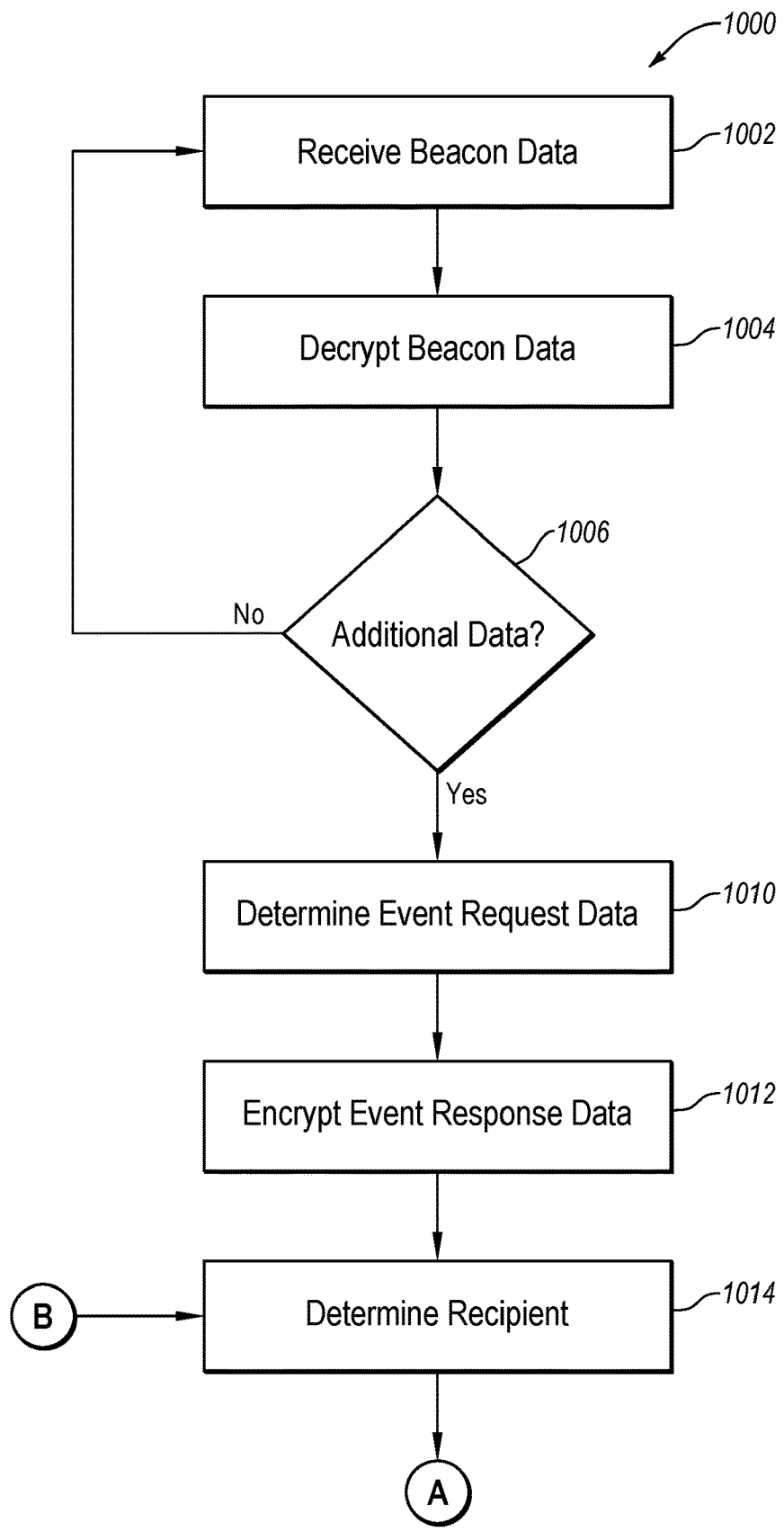
FIGS. 10A and 10B illustrate another example method for determining event response data.
Figure 10B:
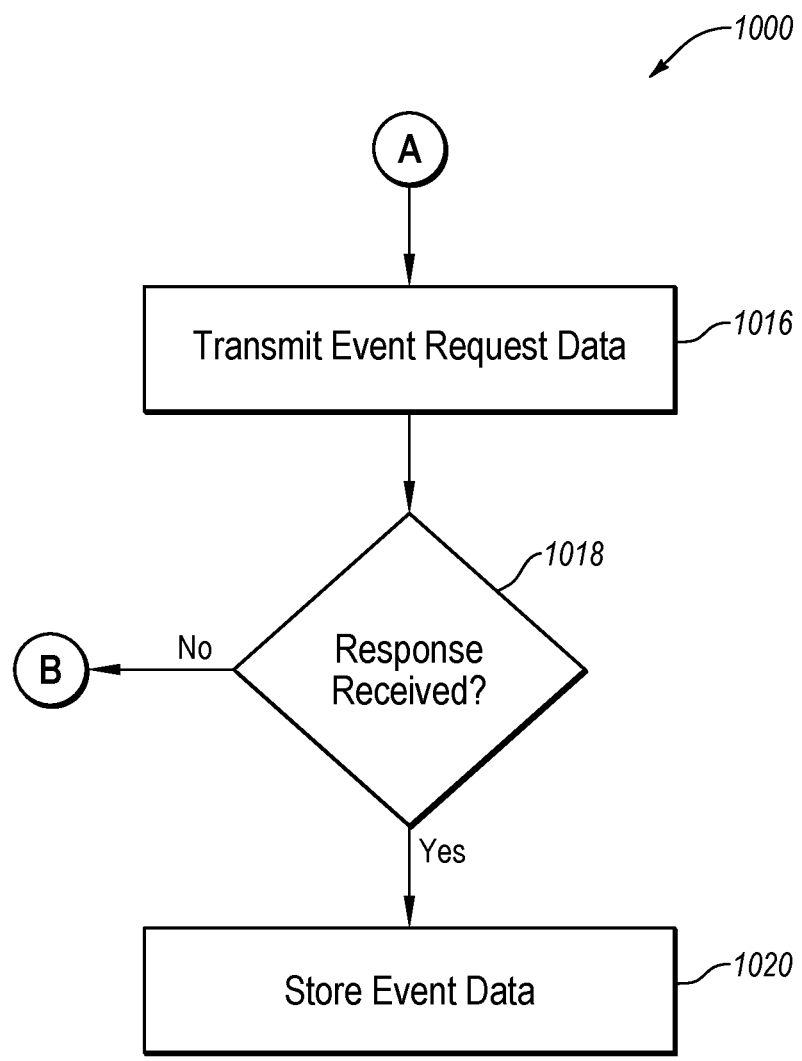

Referring now to FIGS. 10A and 10B, an example of a method 1000 for determining event response data is described, in accordance with at least one embodiment described herein. The method 1000 is described in combination with the FIGS. 1-4 and 7. As illustrated in FIG. 10A, the event manager module 707 may be an element of a first client device 115. In the illustrated implementation, the method 1000 may include the second communication module 702 receiving 1002 beacon data from a second client device 115. The beacon data may include an event log which describes all the events which the second client device 115 has information about. In some instances, the beacon data may include a flag indicating that the beacon data includes a complete record of all the events that have been generated by the DR server 103.

The second decryption module 710 decrypts 1004 the beacon data. The recipient module 712 determines 1006 whether the memory 737 stores announcement data describing all of the events included in the event log. If at step 1006 the announcement data stored in the memory 737 describes all of the events included in the event log, then the method 1000 returns to step 1002. If at step 1006 the announcement data stored in the memory 737 does not describe all of the events included in the event log, then the method 1000 moves to step 1010.

At step 1010 the request module 722 generates an event request. The event request may include data describing a request for announcement data from a second client device 115 that describes one or more events that are not described in the announcement data stored in the memory 737 of the first client device 115. In other words, the event request includes data describing a request for a missing event. The event request can be transmitted to the second client device 115 as a beacon. The second encryption module 708 encrypts 1012 the event request data. The recipient module 712 determines 1014 which peer client may be the recipient of the event request. For example, the recipient module 712 determines 1014 that the recipient is a peer client that has the requested announcement data and is the fewest number of hops from the first client device 115.

Referring now to FIG. 10B, the second communication module 702 transmits 1016 a beacon including the event request data to the recipient. The request module 722 determines 1018 whether a response including the requested announcement data has been received from the recipient. If at step 1018 the request module 722 determines that the response has not been received, then the method 1000 moves back to step 1014 and the recipient module 712 determines a different recipient for the request. Optionally, the method 1000 may wait a predetermined period of time before moving back to step 1014. If at step 1018 the request module 722 determines that the response has been received, then the method 1000 moves to step 1020. At step 1020 the second communication module 702 stores the announcement data in the memory 737.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it may be understood that the various changes, substitutions, and alterations could be made hereto without departing from the spirit and scope of the invention.

What is claimed:

1. A method comprising:
   communicating with a demand response application server according to peer data describing a set of peer clients associated with the demand response application server and how the set of peer clients communicate with one another, the peer data configured such that a subset of the peer clients directly communicate with the demand response application server and the demand response application server does not directly communicate with each of the set of peer clients thereby reducing processing and bandwidth loads for the demand response application server;
   receiving announcement data describing a set of events specified by the demand response application server and not specified by the set of peer clients, the set of events including at least a first event and a second event;
   transmitting beacon data describing the set of events in the announcement data by a first client to a second client included in the set of peer clients such that the second client is capable of transmitting beacon data to a third client included in the set of peer clients;
   receiving, by the first client from the second client, a first request for information about the second event of the set of events specified by the demand response application server, the first request generated based on the second event not being stored in the second client, and the first request excluding the first event of the set of events specified by the demand response application server based on the first event being stored in the second client; and
   transmitting information about the second event to the second client such that the second client is capable of subsequently responding to a second request from the third client to transmit information about the second event to the third client, the second request generated based on the second event not being stored in the third client, and the second request excluding the first event based on the first event being stored in the third client,
   wherein the beacon data includes a flag that includes data used for determining which client from the set of peer clients is in possession of the event not included in the set of events described by the announcement data.

2. The method of claim 1, wherein the beacon data is encrypted using a public key to allow the first client to determine that the beacon data is authentic.

3. The method of claim 1, the method further comprising:
   sending a signal indicative of participation in an energy management program;
   receiving a secret key corresponding to the energy management program;
   in response to a determination to participate in an event of the set of events described by the announcement data, generating response beacon data that is indicative of participation in the event, wherein the event of the set of events corresponds to the energy management program;
   encrypting the response beacon data using the secret key corresponding to the energy management program; and
   sending the response beacon data.

4. The method of claim 1, the method further comprising:
   in response to a determination to participate in an event of the set of events described by the announcement data, generating response beacon data that is indicative of participation in the event; and
   sending the response beacon data to one or more of the set of peer clients according to the peer data.

5. The method of claim 4, the method further comprising sending the response beacon data to two or more peer clients of the set of peer clients according to the peer data such that a redundancy of the response beacon data exists among the set of peer clients.

6. The method of claim 4, wherein sending the response beacon data comprises sending the response beacon data to a lowest-hop-count peer client of the set of peer clients, the lowest-hop-count peer client having the lowest hop count relative to the demand response application server.

7. The method of claim 4, wherein sending the response beacon data comprises sending the response beacon data to at least one of the set of peer clients and not all of the set of peer clients.

8. The method of claim 1, the method further comprising:
   receiving, by a first client included in the set of peer clients, second beacon data describing second events received by a third client included in the set of peer clients;
   determining that the second beacon data describes a particular event that is included in the set of events described by the announcement data; and in response to the determination that the second beacon data describes the particular event that is included in the set of events described by the announcement data, disregarding a description of the particular event of the second beacon data.

9. A method comprising:

receiving, at a client device, peer data from a demand response (DR) application server, the peer data descriptive of how the client device communicates with the DR application server through a first peer client of a plurality of peer clients such that the client device is configured to receive messages from the DR application server through the first peer client and the client device is configured to send messages to the DR application server through the first peer client thereby reducing processing and bandwidth loads for the DR application server;

receiving, at the client device, from a first peer client, announcement data descriptive of a set of DR events including at least a first event and a second event generated by the DR application server and not generated by the plurality of peer clients, the announcement data having been generated by the DR application server and communicated to the client device through the first peer client according to the peer data;

receiving, at the client device, from the first peer client, according to the peer data, beacon data descriptive of the set of DR events in the announcement data, the beacon data having been generated by the first peer client such that the client device is capable of transmitting beacon data to a neighboring client included in the set of peer clients;

transmitting, from the client device, to the first peer client, a first request requesting information about the second event of the set of DR events generated by the DR application server, the first request generated based on the second event not being stored in the client device, and the first request excluding the first event of the set of DR events generated by the DR application server based on the first event being stored in the client device; and receiving, at the client device from the first peer client, information about the second event such that the client device is capable of subsequently responding to a second request from the neighboring client to transmit information about the second event to the neighboring client, the second request generated based on the second event not being stored in the neighboring client, and the second request excluding the first event based on the first event being stored in the neighboring client, wherein the beacon data includes a flag that includes data used for determining which peer clients of the plurality of peer clients has information about the DR event described by the beacon data.

10. The method of claim 9, the method further comprising:

sending, from the client device, to the first peer client, according to the peer data, a signal indicative of participation in an energy management program;

receiving, at the client device, from the first peer client, according to the peer data, a secret key corresponding to the energy management program, the secret key having been generated by the DR application server and distributed to peer clients participating in the energy management program;

in response to a determination for the client device to participate in a particular DR event of the set of DR events described by the announcement data, generating, at the client device, response beacon data that is indicative of participation by the client device in the particular DR event, wherein the particular DR event of the set of DR events corresponds to the energy management program;

encrypting the response beacon data using the secret key corresponding to the energy management program; and sending, from the client device, to the first peer client, according to the peer data, the response beacon data.

11. The method of claim 9, the method further comprising:

in response to a determination for the client device to participate in a particular DR event of the set of DR events described by the announcement data, generating, at the client device, response beacon data that is indicative of participation by the client device in the particular DR event; and sending the response beacon data to the first peer client according to the peer data.

12. The method of claim 11, the method further comprising sending the response beacon data to a second peer client of the plurality of peer clients according to the peer data such that a redundancy of the response beacon data exists among the plurality of peer clients.

13. The method of claim 11, wherein sending the response beacon data comprises sending the response beacon data to the first peer client, based on the first peer client having the lowest hop count relative to the DR application server.

14. The method of claim 11, wherein sending the response beacon data comprises sending the response beacon data to the first peer client and not all of the plurality of peer clients.

15. The method of claim 9, the method further comprising:

receiving, at the client device, from a second peer client of the plurality of peer clients, according to the peer data, second beacon data descriptive of a second DR event, the second beacon data having been generated by the second peer client; and determining that the second DR event is included in the set of DR events of the announcement data; and in response to the determination that the second DR event is include in the set of DR events of the announcement data, disregarding description of the second DR event of the second beacon data.

* * * * *